US012531023B2

(12) United States Patent
Shinada et al.

(10) Patent No.: US 12,531,023 B2
(45) Date of Patent: Jan. 20, 2026

(54) DISPLAY DEVICE

(71) Applicant: Sharp Display Technology Corporation, Kameyama (JP)

(72) Inventors: Kei Shinada, Kameyama (JP); Kazuki Takahashi, Kameyama (JP); Kazuo Nakamura, Kameyama (JP); Noriyuki Tanaka, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/838,165

(22) PCT Filed: Apr. 19, 2022

(86) PCT No.: PCT/JP2022/018196
§ 371 (c)(1),
(2) Date: Aug. 13, 2024

(87) PCT Pub. No.: WO2023/203642
PCT Pub. Date: Oct. 26, 2023

(65) Prior Publication Data

US 2025/0148981 A1 May 8, 2025

(51) Int. Cl.
*G09G 3/3233* (2016.01)

(52) U.S. Cl.
CPC ..................... *G09G 3/3233* (2013.01); *G09G 2300/0426* (2013.01); *G09G 2300/0842* (2013.01); *G09G 2330/021* (2013.01)

(58) Field of Classification Search
None
See application file for complete search history.

(56) References Cited

U.S. PATENT DOCUMENTS 7,012,586 B2 * 3/2006 Kageyama ........... G09G 3/3291 345/206
2001/0020935 A1 * 9/2001 Gelbman ......... G06K 19/07758 345/173
2003/0030630 A1 * 2/2003 Bayot ...................... G09G 3/20 345/204

(Continued)

FOREIGN PATENT DOCUMENTS

JP 2003-150082 A 5/2003
JP 2004-151501 A 5/2004

(Continued)

*Primary Examiner* — Dorothy Harris
(74) *Attorney, Agent, or Firm* — ScienBiziP, P.C.

(57) ABSTRACT

A display device includes a plurality of subpixels that include pixel circuits respectively including light-emitting elements, a display region that includes the plurality of subpixels, a frame region that is provided outside the display region, first power supply voltage wiring lines for supplying a high potential side power supply to the pixel circuits, second power supply voltage wiring lines for supplying a low potential side power supply to the pixel circuits, one or more adjustment circuits each of which includes a switching element and an adjustment element and is connected to the first power supply voltage wiring lines and the second power supply voltage wiring lines, and a control circuit that controls a current value of the adjustment element in accordance with image data.

18 Claims, 19 Drawing Sheets

(56) References Cited

U.S. PATENT DOCUMENTS

| | | | | |
|---|---|---|---|---|
| 2005/0041002 | A1* | 2/2005 | Takahara | H10K 50/8428 345/76 |
| 2005/0062691 | A1 | 3/2005 | Tamura et al. | |
| 2005/0088103 | A1* | 4/2005 | Kageyama | G09G 3/325 315/169.3 |
| 2007/0095639 | A1* | 5/2007 | Kim | G09G 3/3216 200/310 |
| 2011/0134340 | A1* | 6/2011 | Yamashita | G09G 3/3233 345/212 |
| 2013/0215158 | A1* | 8/2013 | Fujita | G09G 3/3291 345/77 |
| 2015/0239258 | A1* | 8/2015 | Yano | B41J 2/45 347/247 |
| 2020/0175905 | A1* | 6/2020 | Yamazaki | G02F 1/134363 |

FOREIGN PATENT DOCUMENTS

| | | | |
|---|---|---|---|
| JP | 2006-276324 | A | 10/2006 |
| JP | 2007-187763 | A | 7/2007 |
| JP | 2012-141456 | A | 7/2012 |
| JP | 2015-157391 | A | 9/2015 |

* cited by examiner

DISPLAY DEVICE

TECHNICAL FIELD

The disclosure relates to a display device.

BACKGROUND ART

In recent years, various display devices including light-emitting elements have been developed. Particularly, a display device including an organic light emitting diode (OLED) or a quantum dot light emitting diode (QLED) has drawn a great deal of attention because advantages such as lower power consumption, smaller thickness, and higher picture quality can be achieved. In the field of such display devices, development for realizing higher picture quality has been actively conducted.

In a driving device of a display panel disclosed in PTL 1, a configuration in which a resistance element is connected in series to each of a common anode line and a common cathode line to increase the resistance of the entire common anode line and common cathode line is disclosed. According to this configuration, since a voltage drop ΔV (=I×R) is large when a lighting rate of light-emitting elements arranged in a display panel in which the amount of current flowing through each of the common anode line and the common cathode line is increased is high, the luminance of each of the light-emitting elements is decreased due to the voltage drop, thereby realizing low power consumption. On the other hand, the voltage drop ΔV (=I×R) is small when a lighting rate of the light-emitting elements arranged in the display panel in which the amount of current flowing through each of the common anode line and the common cathode line is decreased is low, and thus the luminance of each of the light-emitting elements is maintained without a large decrease, thereby realizing a high contrast of a display screen.

CITATION LIST

Patent Literature

PTL 1: JP 2006-276324 A

SUMMARY

Technical Problem

However, the driving device of the display panel disclosed in PTL 1 does not give consideration to a luminance difference between the light-emitting elements due to a difference in the lighting rate between the light-emitting elements arranged in the display panel which occurs based on a wiring line resistance of each of the common anode line and the common cathode line, except for the resistance element described above. Thus, in the driving device of the display panel disclosed in PTL 1, even when one or more light-emitting elements arranged in the display panel are caused to emit light based on the same gray scale value, the resistance element functioning as a luminance adjusting means is used such that a larger difference occurs in the actual light emission luminance of each light-emitting element between the case of a high lighting rate and the case of a low lighting rate, resulting in a problem that display quality deteriorates.

Further, in the driving device of the display panel disclosed in PTL 1, since the resistance element is connected in series to each of the common anode line and the common cathode line, when a failure occurs in the resistance element, the entire display panel is affected. For this reason, the display panel may become defective, also resulting in a problem that a yield is decreased.

Furthermore, in the driving device of the display panel disclosed in PTL 1, the resistance element is connected in series to each of the common anode line and the common cathode line, also resulting in a problem that an unnecessary increase in resistance and an excessive voltage drop are caused in each of the common anode line and the common cathode line.

An aspect of the disclosure has been made in view of the above-described problems, and an object thereof is to provide a display device in which, when one or more light-emitting elements are caused to emit light based on the same gray scale value, occurrence of a large difference in the actual light emission luminance of each light-emitting element between the case of a high lighting rate and the case of a low lighting rate is suppressed without causing an unnecessary increase in resistance of a first power supply voltage wiring line and a second power supply voltage wiring line, an excessive voltage drop, and a decrease in yield.

Solution to Problem

In order to solve the above-described problem, a display device of the disclosure includes a plurality of subpixels that include pixel circuits respectively including light-emitting elements, a display region that includes the plurality of subpixels, a frame region that is provided outside the display region, a first power supply voltage wiring line for supplying a high potential side power supply to the pixel circuit, a second power supply voltage wiring line for supplying a low potential side power supply to the pixel circuit, one or more adjustment circuits each of which includes a switching element and an adjustment element and is connected to the first power supply voltage wiring line and the second power supply voltage wiring line, and a control circuit that controls a current value of the adjustment element in accordance with image data.

Advantageous Effects of Disclosure

An aspect of the disclosure has been made in view of the above-described problems, and it is possible to provide a display device in which, when one or more light-emitting elements are caused to emit light based on the same gray scale value, occurrence of a large difference in the actual light emission luminance of each light-emitting element between the case of a high lighting rate and the case of a low lighting rate is suppressed without causing an unnecessary increase in resistance of a first power supply voltage wiring line and a second power supply voltage wiring line, an excessive voltage drop, and a decrease in yield.

Figure 8:
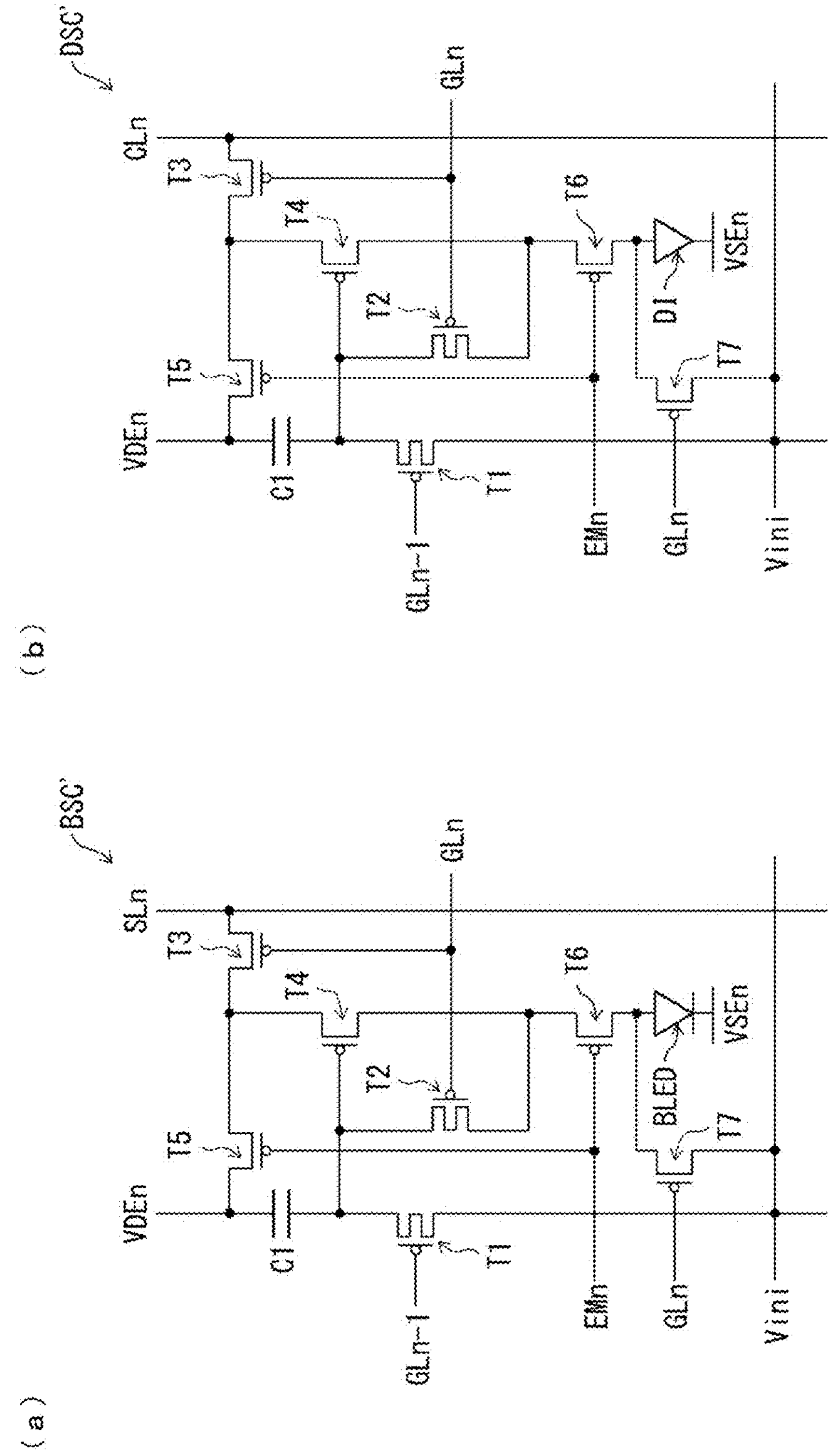

(a) of FIG. 8 is a diagram showing another subpixel circuit that can be provided in the display device according to the first embodiment, and (b) of FIG. 8 is a diagram showing another adjustment circuit that can be provided in the display device according to the first embodiment.

Figure 9:
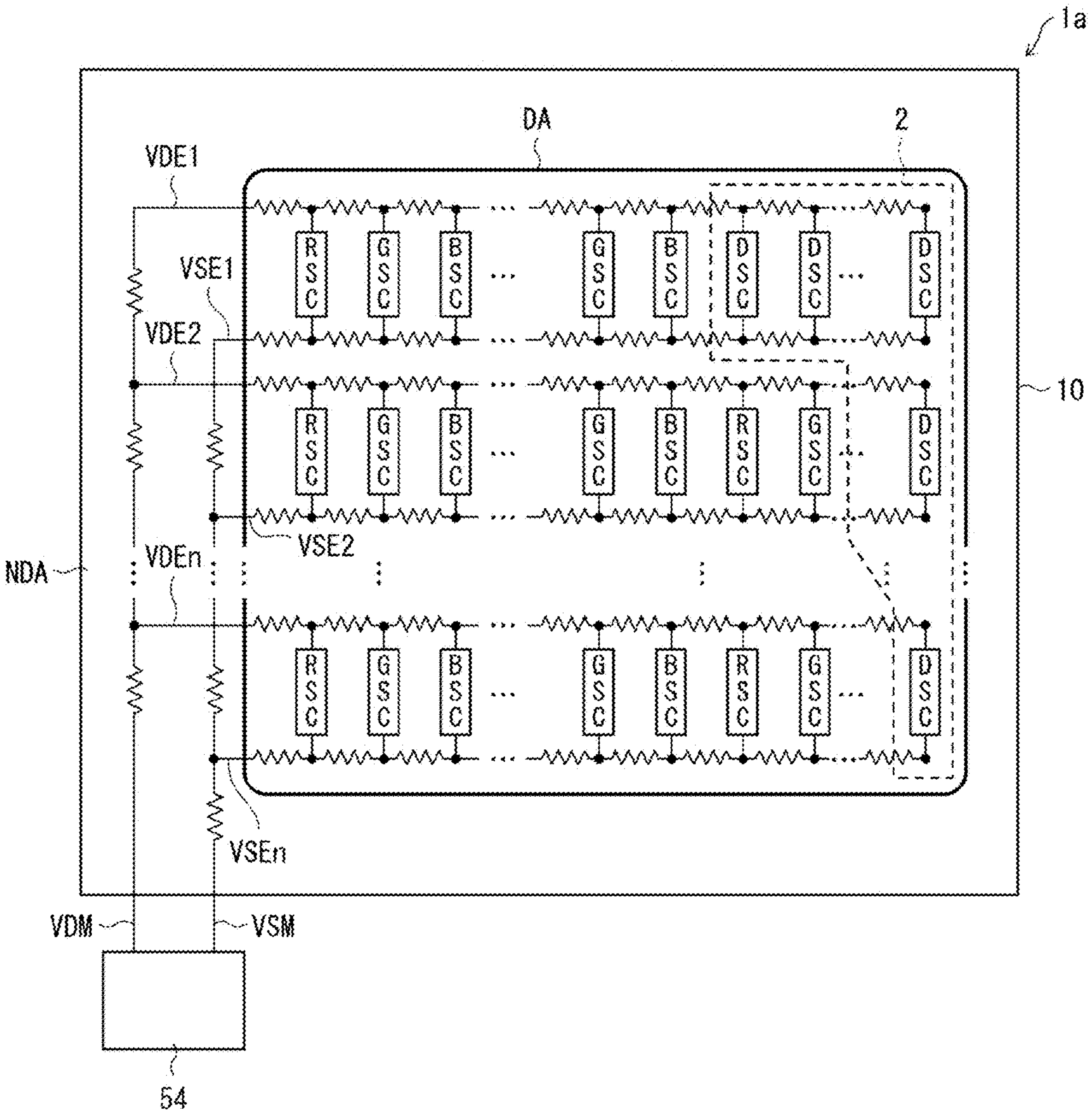

FIG. 9 is a circuit diagram including first power supply voltage wiring lines, second power supply voltage wiring lines, subpixel circuits, and adjustment circuits which are provided in a display device according to a second embodiment.

Figure 10:
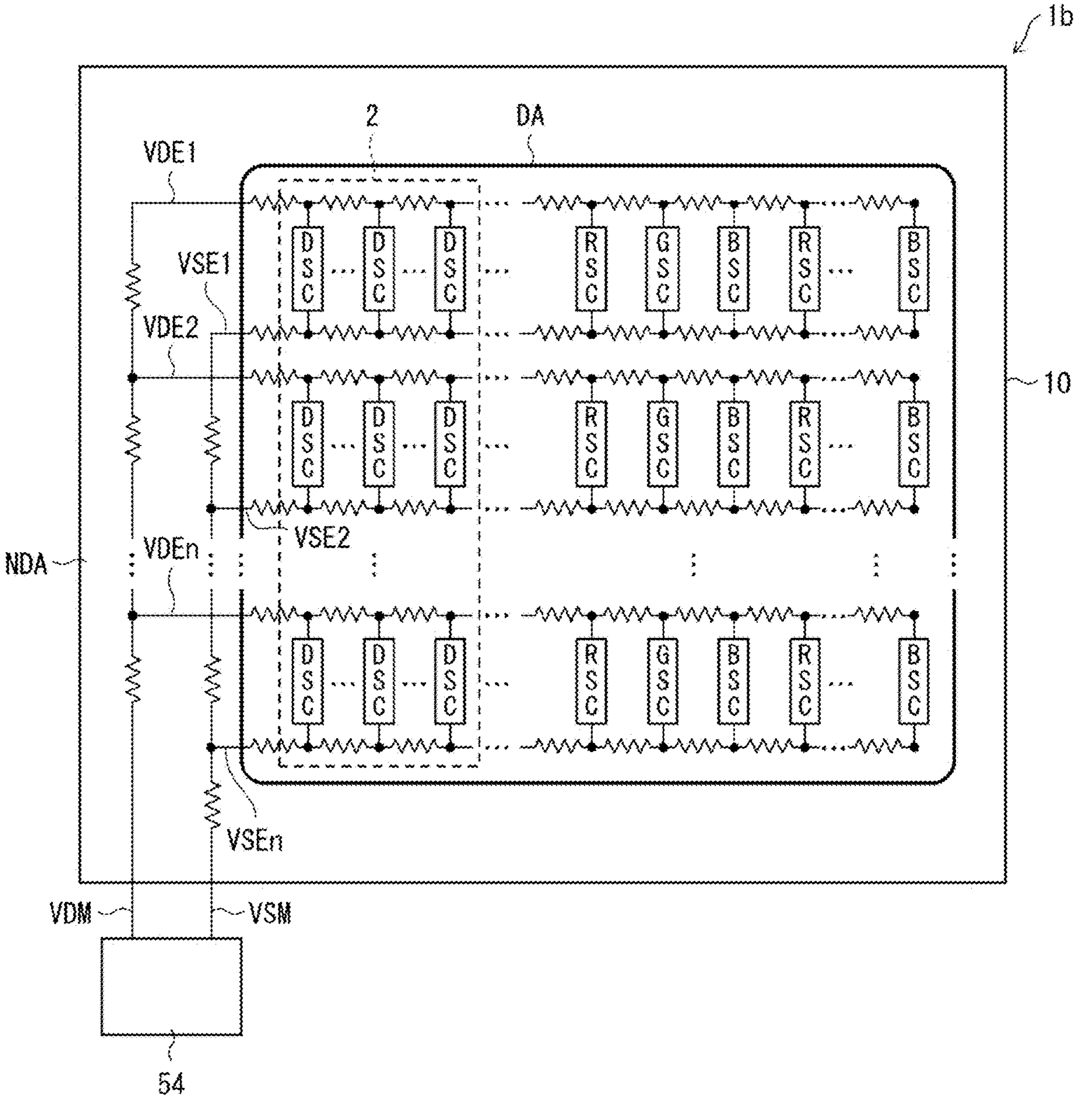

FIG. 10 is a circuit diagram including first power supply voltage wiring lines, second power supply voltage wiring lines, subpixel circuits, and adjustment circuits which are provided in a display device according to a third embodiment.

Figure 11:
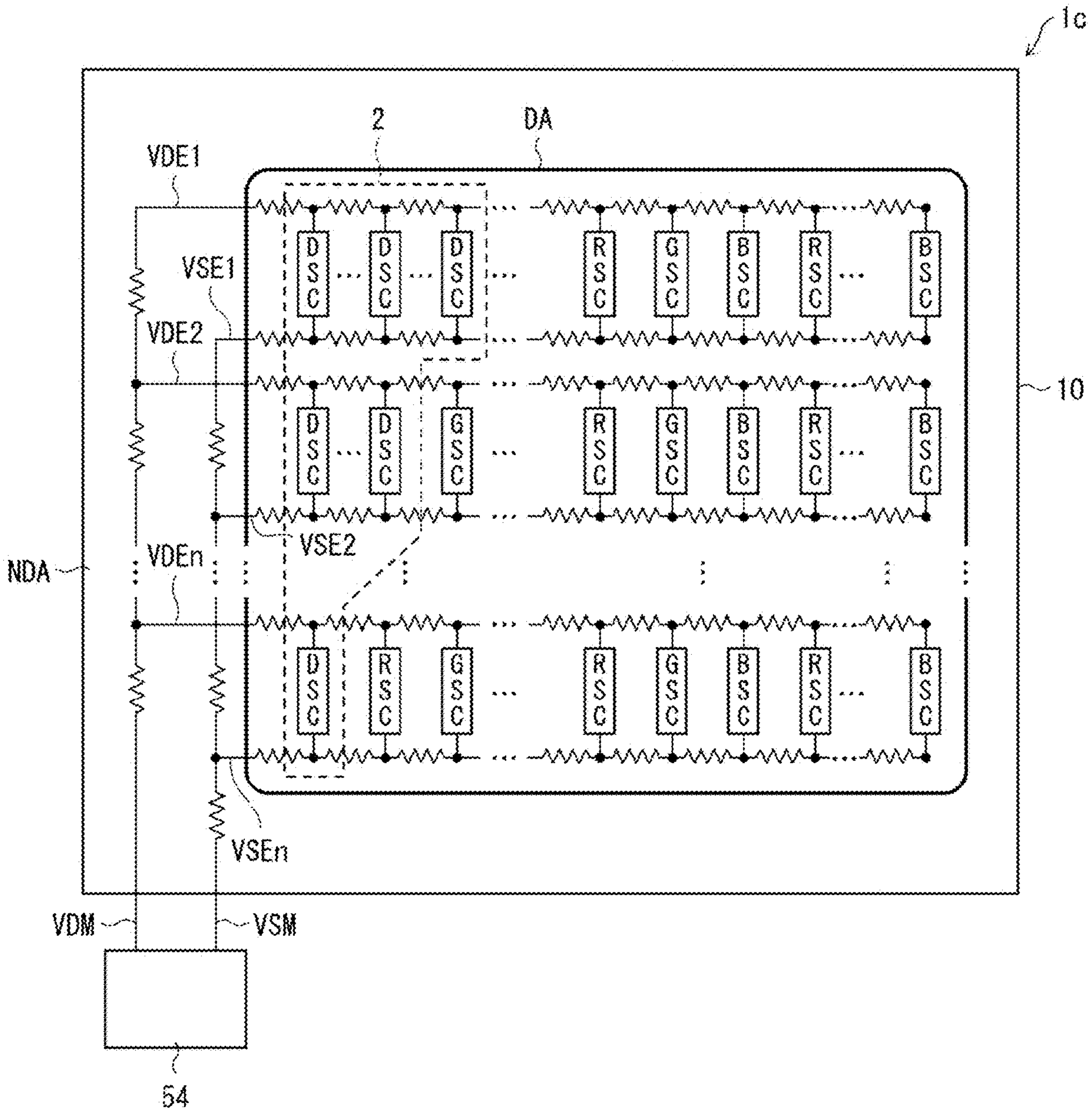

FIG. 11 is a circuit diagram including first power supply voltage wiring lines, second power supply voltage wiring lines, subpixel circuits, and adjustment circuits which are provided in a display device according to a fourth embodiment.

Figure 12:
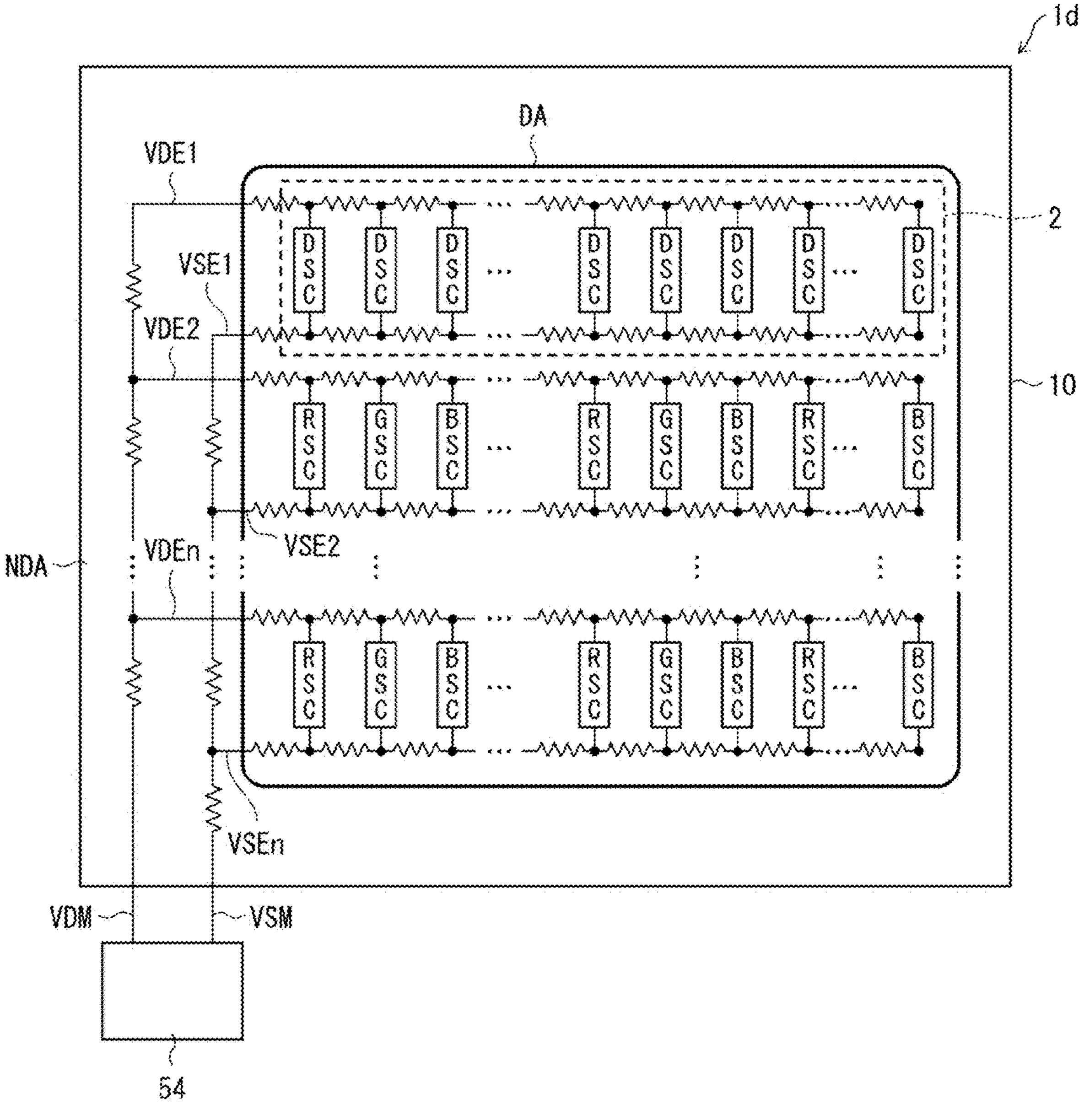

FIG. 12 is a circuit diagram including first power supply voltage wiring lines, second power supply voltage wiring lines, subpixel circuits, and adjustment circuits which are provided in a display device according to a fifth embodiment.

Figure 13:
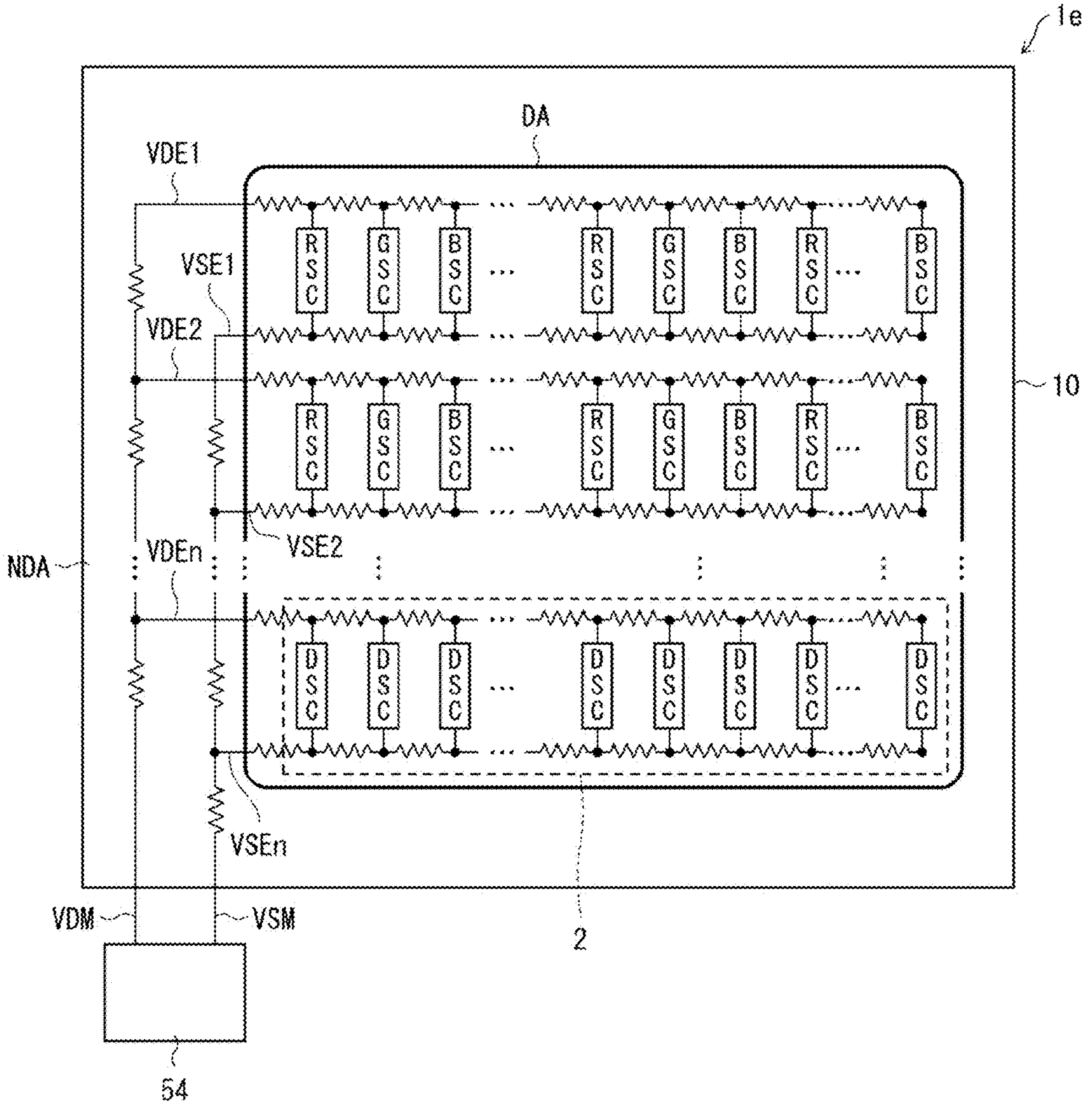

FIG. 13 is a circuit diagram including first power supply voltage wiring lines, second power supply voltage wiring lines, subpixel circuits, and adjustment circuits which are provided in a display device according to a sixth embodiment.

Figure 14:
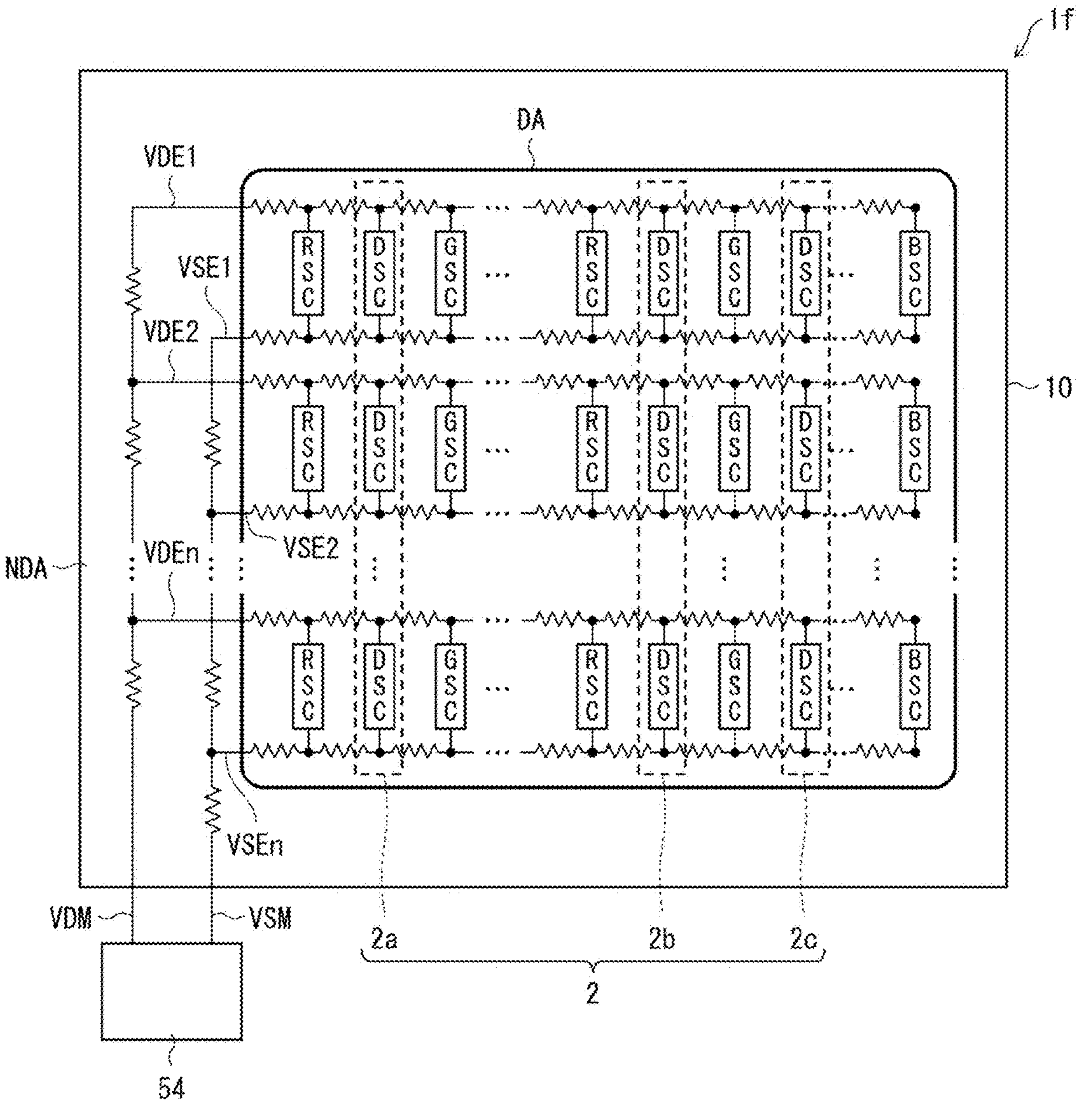

FIG. 14 is a circuit diagram including first power supply voltage wiring lines, second power supply voltage wiring lines, subpixel circuits, and adjustment circuits which are provided in a display device according to a seventh embodiment.

Figure 15:
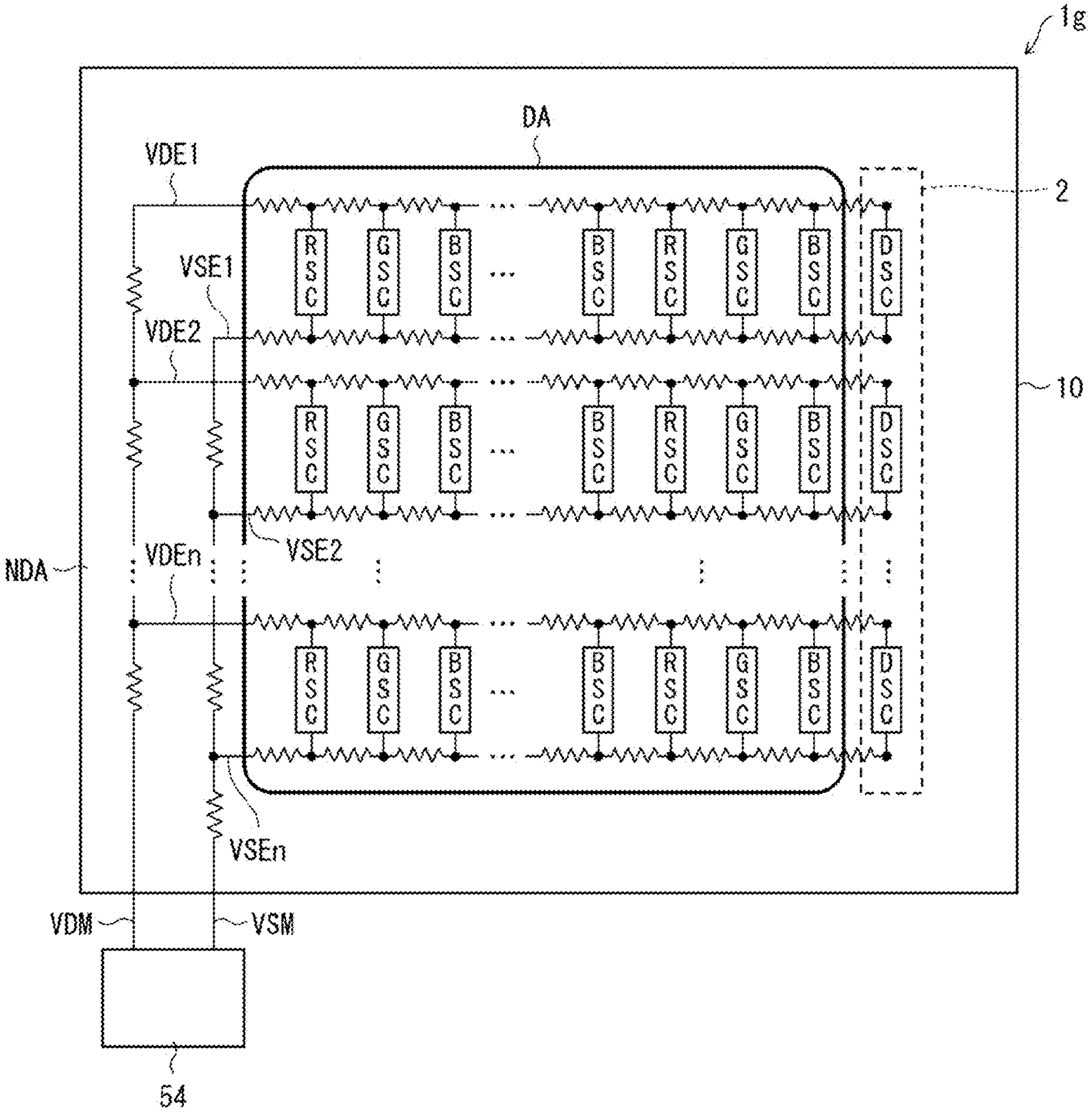

FIG. 15 is a circuit diagram including first power supply voltage wiring lines, second power supply voltage wiring lines, subpixel circuits, and adjustment circuits which are provided in a display device according to an eighth embodiment.

Figure 16:
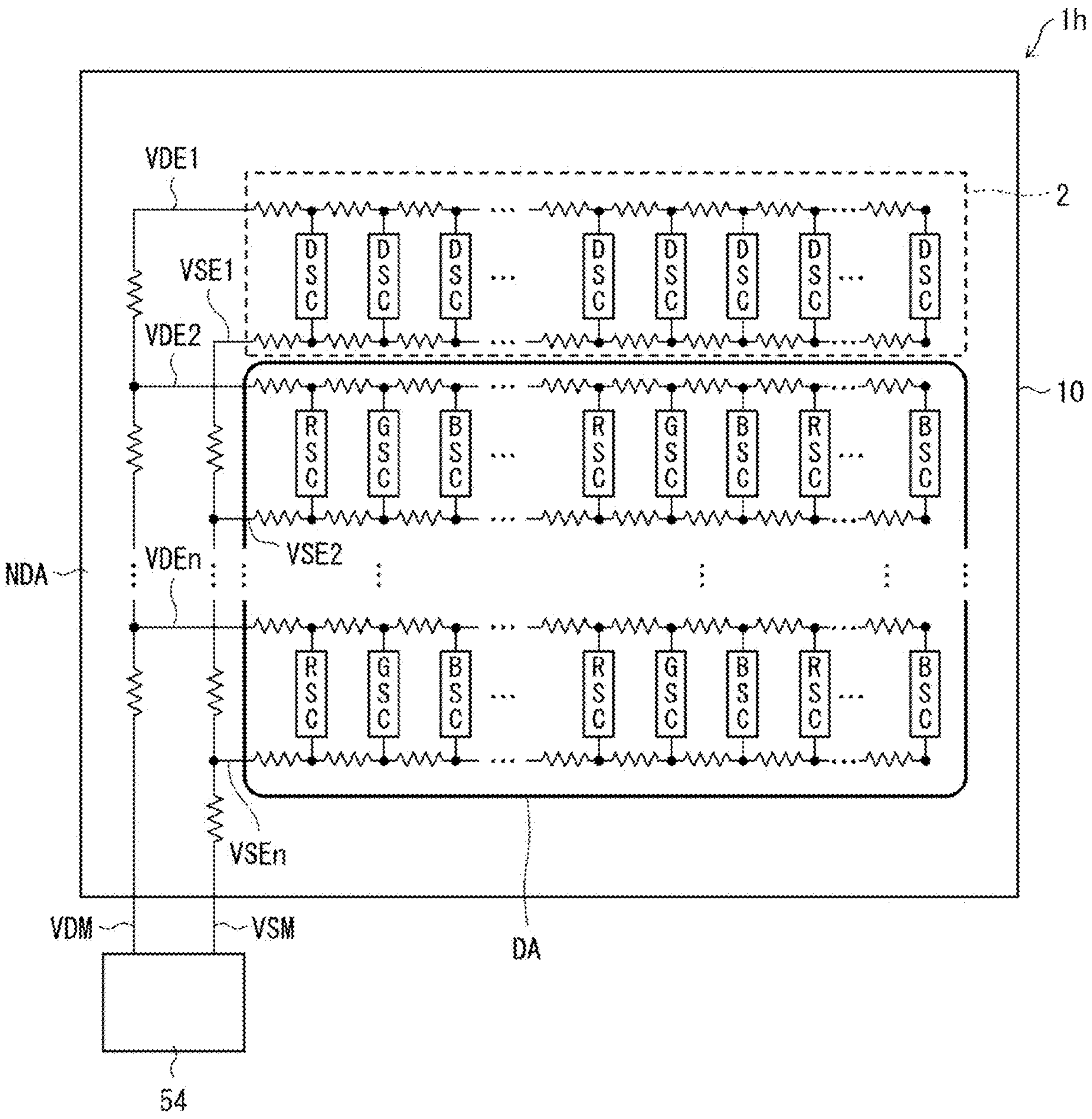

FIG. 16 is a circuit diagram including first power supply voltage wiring lines, second power supply voltage wiring lines, subpixel circuits, and adjustment circuits which are provided in a display device according to a ninth embodiment.

Figure 17:
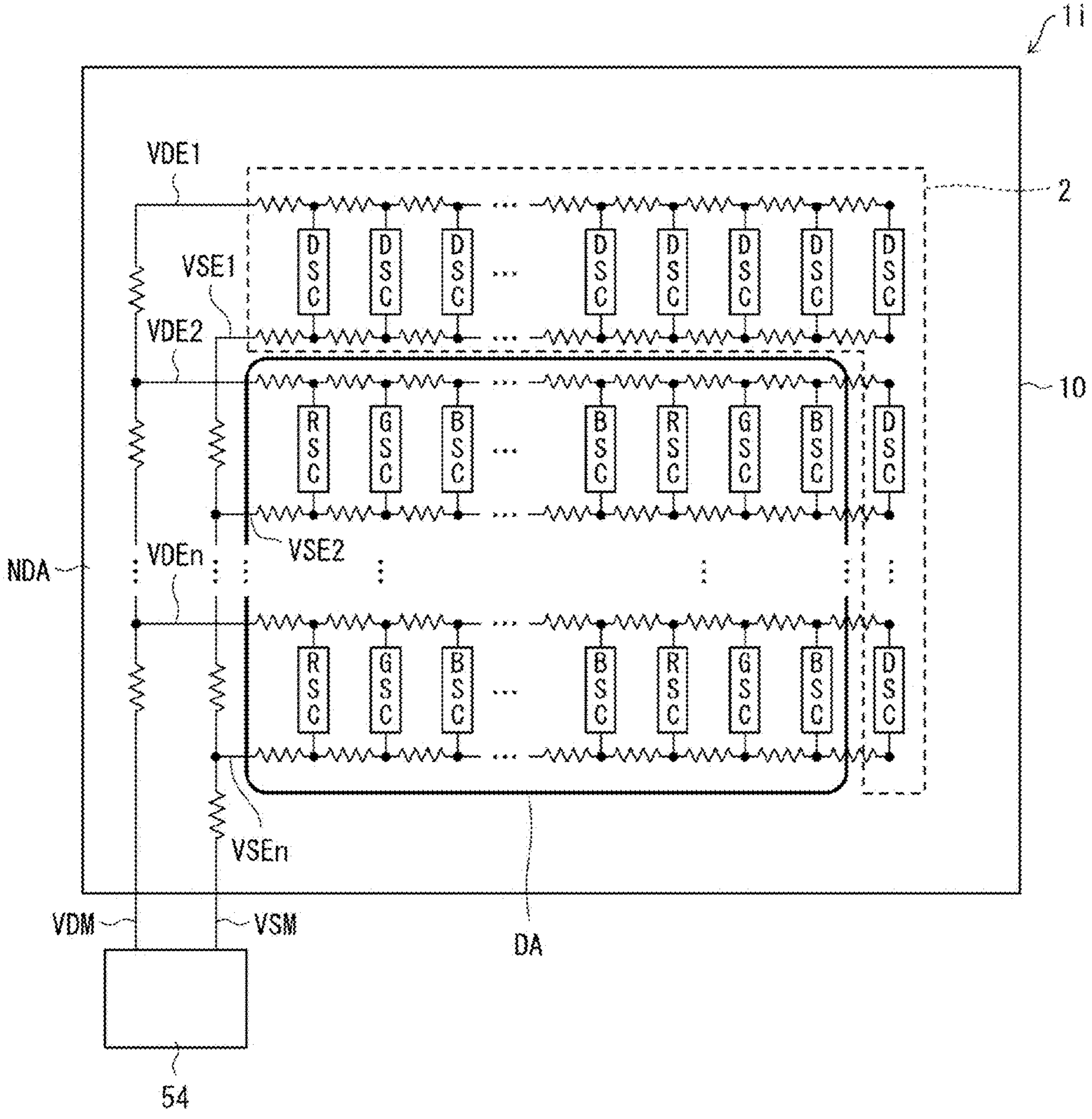

FIG. 17 is a circuit diagram including first power supply voltage wiring lines, second power supply voltage wiring lines, subpixel circuits, and adjustment circuits which are provided in a display device according to a tenth embodiment.

Figure 18:
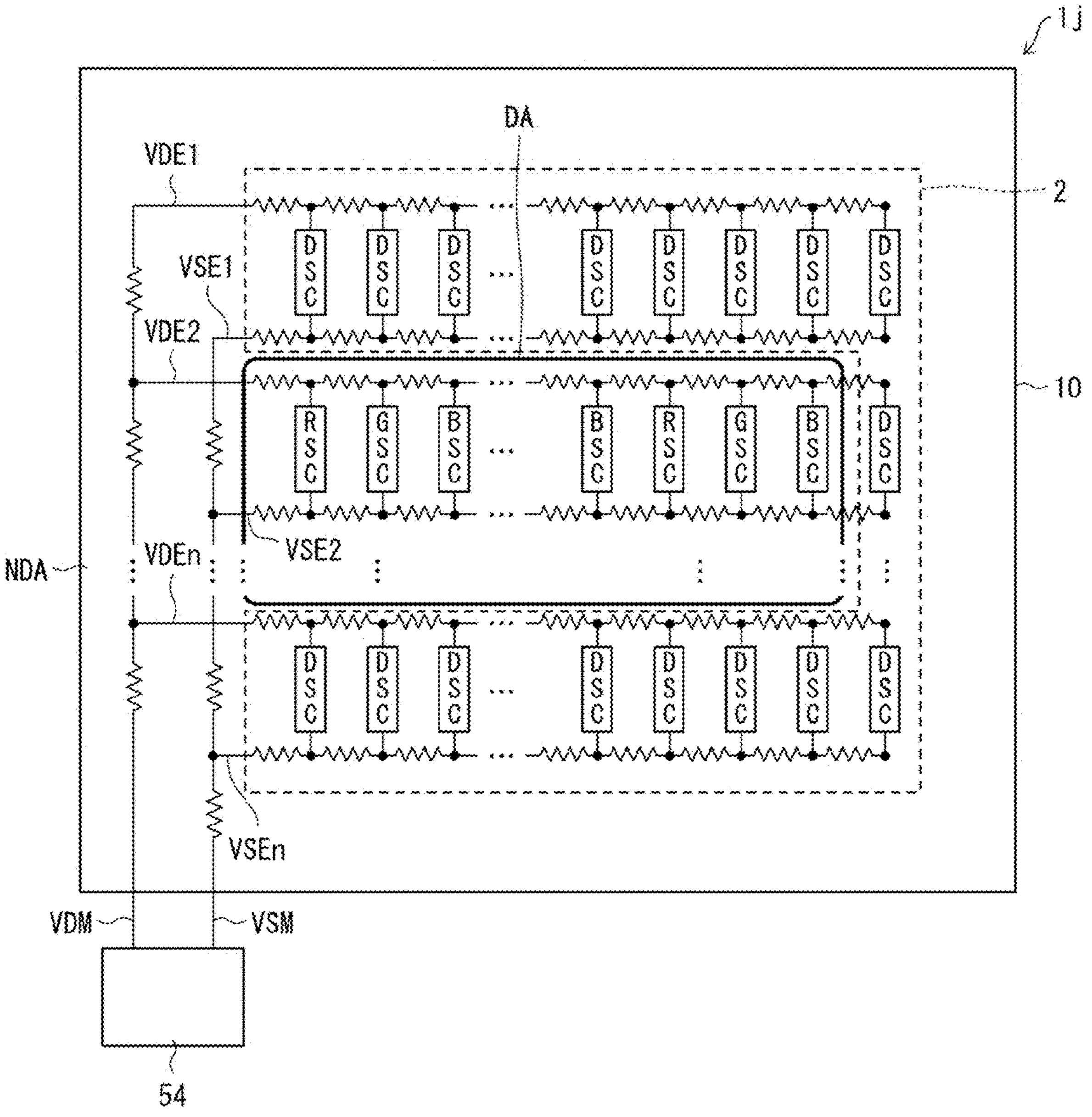

FIG. 18 is a circuit diagram including first power supply voltage wiring lines, second power supply voltage wiring lines, subpixel circuits, and adjustment circuits which are provided in a display device according to an eleventh embodiment.

Figure 19:
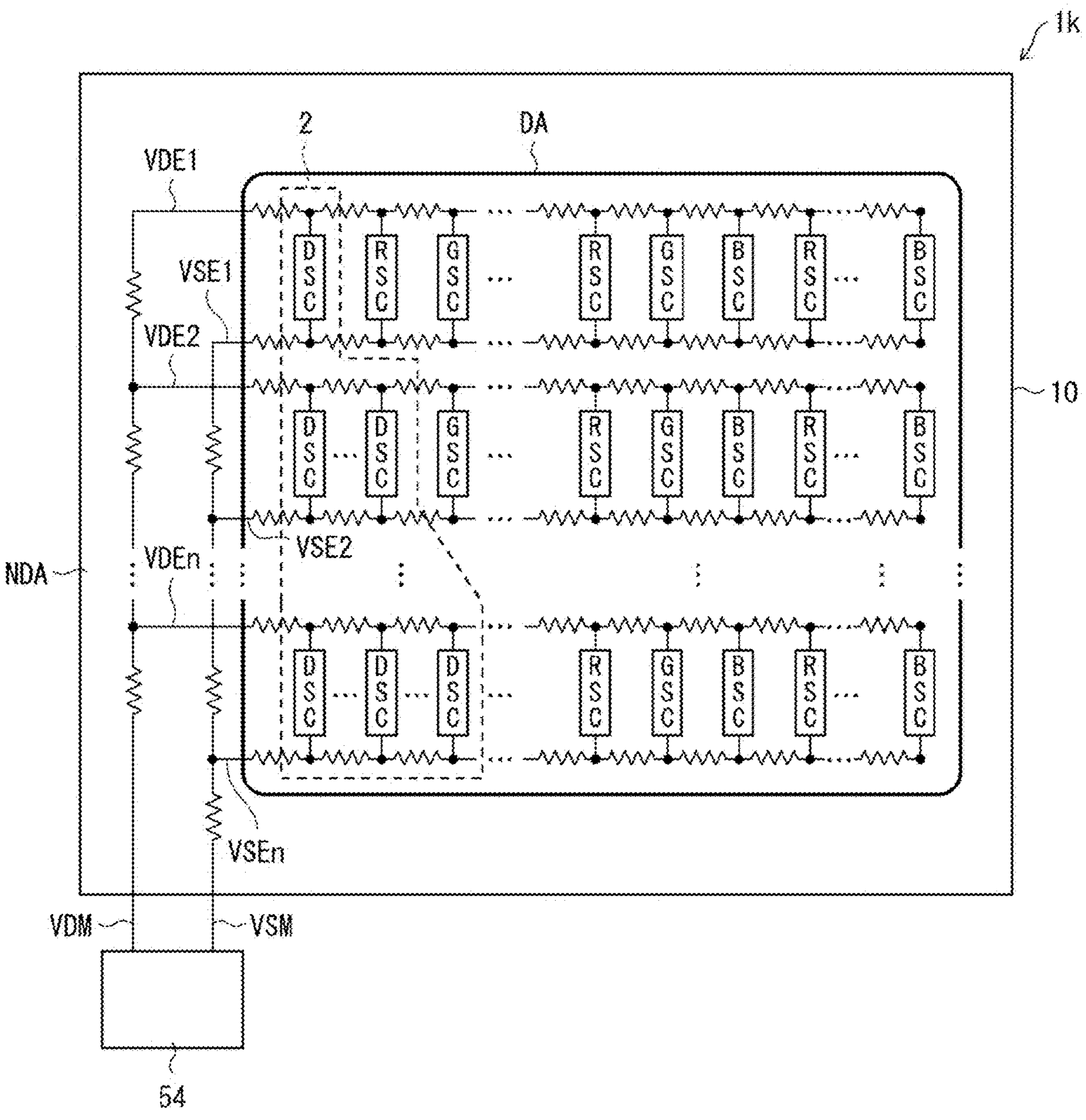

FIG. 19 is a circuit diagram including first power supply voltage wiring lines, second power supply voltage wiring lines, subpixel circuits, and adjustment circuits which are provided in a display device according to a twelfth embodiment.

Figure 20:
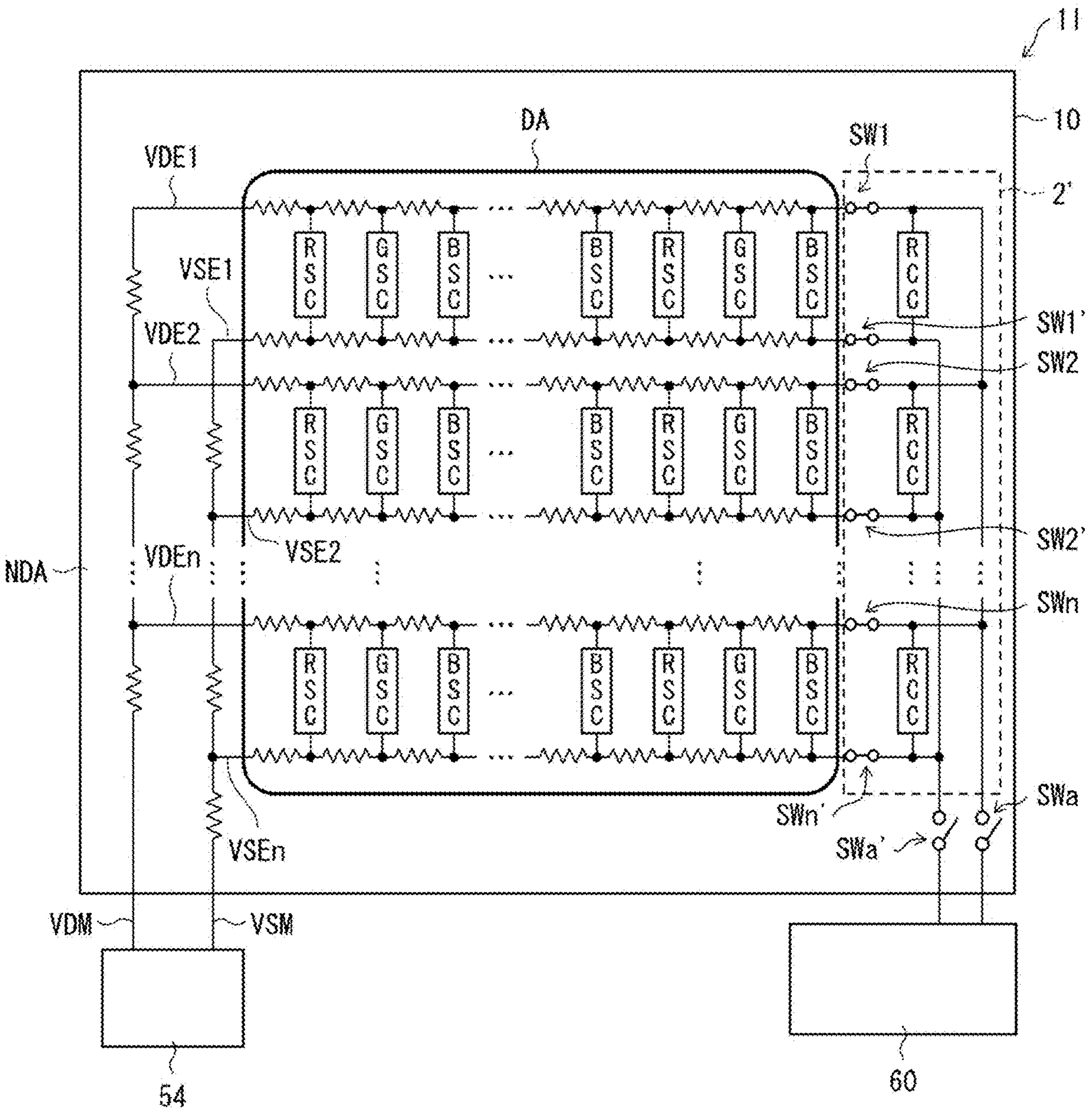

FIG. 20 is a circuit diagram including first power supply voltage wiring lines, second power supply voltage wiring lines, subpixel circuits, and adjustment circuits including charging elements, which are provided in a display device according to a thirteenth embodiment, and shows a case where the charging elements are charged.

Figure 21:
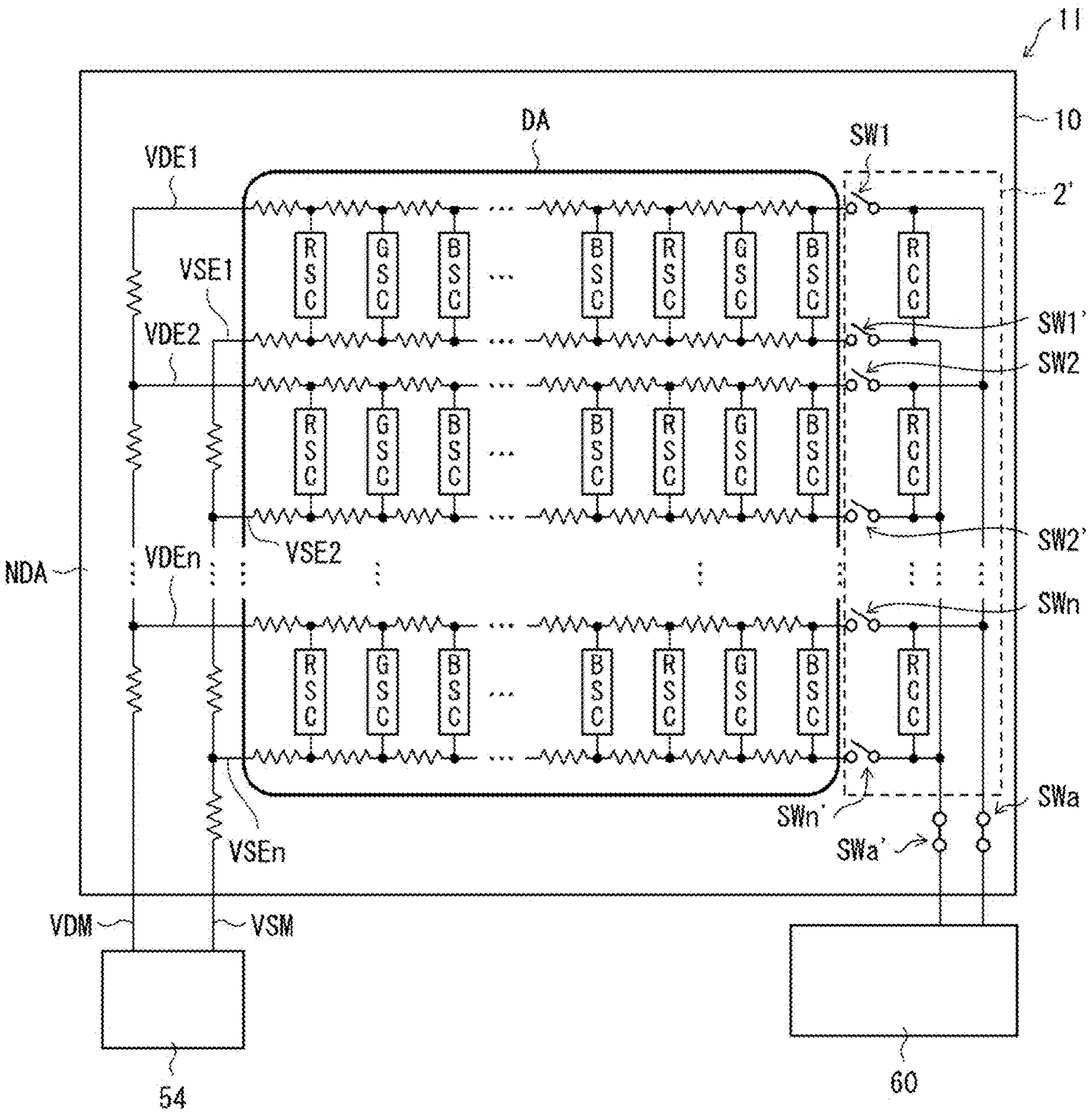

FIG. 21 is a circuit diagram including the first power supply voltage wiring lines, the second power supply voltage wiring lines, the subpixel circuits, and the adjustment circuits including the charging elements, which are provided in the display device according to the thirteenth embodiment, and shows a case where the charging elements are discharged.

DESCRIPTION OF EMBODIMENTS

Embodiments of the disclosure will be described with reference to FIG. 1 to FIG. 21 as follows. Hereinafter, for convenience of description, configurations having the same functions as those described in a specific embodiment are denoted by the same reference signs, and descriptions thereof will be omitted.

First Embodiment

Figure 1:
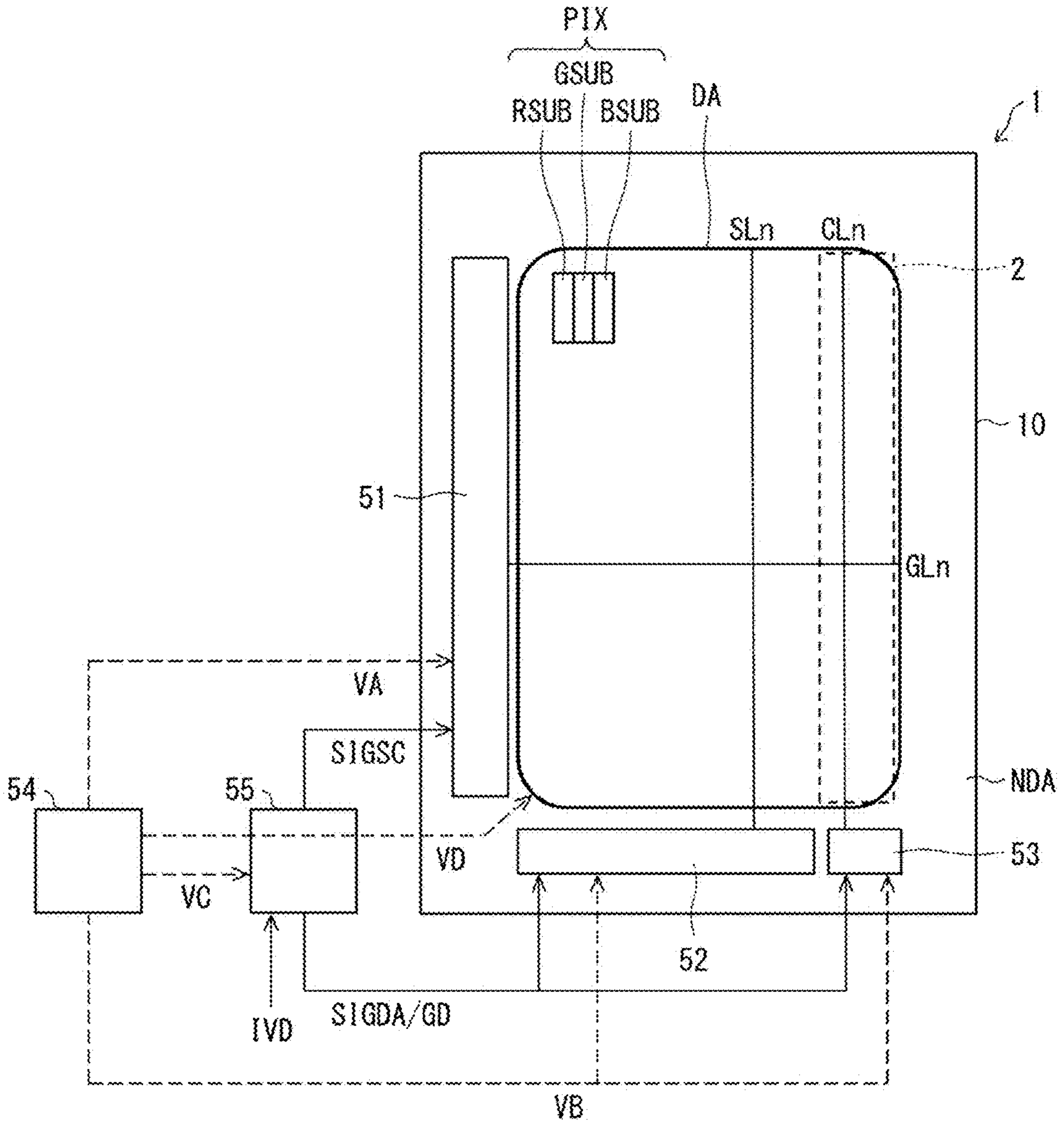
FIG. 1 is a plan view showing a schematic configuration of a display device according to a first embodiment.

FIG. 1 is a plan view showing a schematic configuration of a display device 1 according to a first embodiment.

As shown in FIG. 1, the display device 1 includes a substrate 10, a display region DA including a red subpixel RSUB, a green subpixel GSUB, and a blue subpixel BSUB provided on the substrate 10, and a frame region NDA provided outside the display region DA provided on the substrate 10.

A plurality of pixels PIX are provided in the display region DA, and each of the pixels PIX includes, for example, a red subpixel RSUB, a green subpixel GSUB, and a blue subpixel BSUB. In the present embodiment, a case where one pixel PIX includes a red subpixel RSUB, a green subpixel GSUB, and a blue subpixel BSUB is described as an example, but the disclosure is not limited thereto. For example, one pixel PIX may further include a subpixel of another color in addition to the red subpixel RSUB, the green subpixel GSUB, and the blue subpixel BSUB.

The frame region NDA includes a scanning-side drive circuit 51, a data-side drive circuit 52, and a control circuit 53 that controls an adjustment circuit. In the present embodiment, a case where the scanning-side drive circuit 51, the data-side drive circuit 52, and the control circuit 53 are provided in the frame region NDA is described as an example, but the disclosure is not limited thereto. For example, at least one of the scanning-side drive circuit 51, the data-side drive circuit 52, and the control circuit 53 may be externally attached to the display device 1. Further, a part of at least one of the scanning-side drive circuit 51, the data-side drive circuit 52, and the control circuit 53 may be provided in the display region DA.

As shown in FIG. 1, in the display device 1 of the present embodiment, a case where the data-side drive circuit 52 and the control circuit 53 controlling the adjustment circuit are separately provided is described as an example, but the disclosure is not limited thereto. For example, as will be described later with reference to FIG. 6, the data-side drive circuit and the control circuit controlling the adjustment circuit may be integrated.

In the present embodiment, a case where a power supply circuit 54 and a display control circuit 55 shown in FIG. 1 are externally attached to the display device 1 is described as an example, but the disclosure is not limited thereto, and at least one of the power supply circuit 54 and the display control circuit 55 may be provided in the frame region NDA.

As indicated by dotted lines in FIG. 1, the power supply circuit 54 generates and supplies a power supply voltage VA to be supplied to the scanning-side drive circuit 51, a power supply voltage VB to be supplied to the data-side drive circuit 52 and the control circuit 53, a power supply voltage VC to be supplied to the display control circuit 55, and a plurality of types of power supply voltages VD to be supplied to the display region DA, specifically, a high-level power supply voltage ELVDD and a low-level power supply voltage ELVSS.

The display control circuit 55 receives an input image signal (image data) IVD including image information and timing control information for performing image display from the outside of the display device 1, generates a scanning-side control signal SIGSC, a data-side control signal SIGDA, and write data GD based on the input image signal IVD, and supplies the scanning-side control signal SIGSC to the scanning-side drive circuit 51 and supplies the data-side control signal SIGDA and the write data GD to the data-side drive circuit 52 and the control circuit 53, respectively.

Based on the input image signal IVD, the display control circuit 55 generates data (first write data) of an appropriate voltage value for performing control so that each of a red light-emitting element provided in the red subpixel RSUB, a green light-emitting element provided in the green subpixel GSUB, and a blue light-emitting element provided in the blue subpixel BSUB which are included in the display region DA of the display device 1 emits light at a predetermined luminance. Further, the display control circuit 55 generates data (second write data) of an appropriate voltage value for controlling the adjustment circuit based on the input image signal IVD.

The write data GD supplied from the display control circuit 55 to the data-side drive circuit 52 and the control circuit 53 includes the first write data and the second write data. When the data-side drive circuit 52 for controlling the light-emitting elements of the respective colors included in the display region DA of the display device 1 and the control circuit 53 controlling the adjustment circuit are separately provided as in the present embodiment, the first write data is supplied from the display control circuit 55 to the data-side drive circuit 52, and the second write data is supplied from the display control circuit 55 to the control circuit 53.

In the present embodiment, a case where the display control circuit 55 generates both the first write data and the second write data is described as an example, but the disclosure is not limited thereto, and the display control circuit 55 may generate the first write data and the control circuit 53 controlling the adjustment circuit may generate the second write data. In this manner, when the control circuit 53 controlling the adjustment circuit generates the second write data, the input image signal IVD may be supplied to the display control circuit 55 and the control circuit 53 controlling the adjustment circuit, or the input image signal IVD may be supplied from the display control circuit 55 to the control circuit 53 controlling the adjustment circuit.

As shown in FIG. 1, the display region DA of the display device 1 is provided with a plurality of data signal lines SLn (only one data signal line is shown in FIG. 1) extending in the up-down direction in the drawing, a plurality of control signal lines CLn (only one control signal line is shown in FIG. 1) extending in the up-down direction in the drawing, and a plurality of scanning signal lines GLn (only one scanning signal line is shown in FIG. 1) extending in the right-left direction in the drawing. The plurality of control signal lines CLn are formed in a region 2 in which the adjustment circuit indicated by a dotted line in FIG. 1 is formed.

The scanning-side drive circuit 51 generates a scanning signal based on the scanning-side control signal SIGSC and outputs the scanning signal via the scanning signal line GLn. The scanning-side control signal SIGSC supplied from the display control circuit 55 to the scanning-side drive circuit 51 includes, for example, a gate start pulse signal and a plurality of gate clock signals, and the power supply voltage VA supplied from the power supply circuit 54 to the scanning-side drive circuit 51 includes, for example, a gate low voltage VGL and a gate high voltage VGH.

The data-side drive circuit 52 outputs the first write data in the write data GD supplied from the display control circuit 55 as a data signal via the data signal line SLn based on the data-side control signal SIGDA supplied from the display control circuit 55.

In the present embodiment, the control circuit 53 controlling the adjustment circuit outputs the second write data in the write data GD supplied from the display control circuit 55 as a control signal for controlling the adjustment circuit via control signal lines CL1 to CLn based on the data-side control signal SIGDA supplied from the display control circuit 55.

On the other hand, when the display control circuit 55 generates the first write data and the control circuit 53 controlling the adjustment circuit generates the second write data, the control circuit 53 controlling the adjustment circuit outputs the second write data generated by itself as a control signal for controlling the adjustment circuit via the control signal lines CL1 to CLn based on the data-side control signal SIGDA supplied from the display control circuit 55.

When the input image signal (image data) IVD input to the display control circuit 55 includes first image data and second image data, and the amount of current flowing through first power supply voltage wiring lines VDM and VDE1 to VDEn (see FIG. 2) and second power supply voltage wiring lines VSM and VSE1 to VSEn (see FIG. 2) in a first case where display is performed in the display region DA based on the first image data is smaller than the amount of current flowing through the first power supply voltage wiring lines VDM and VDE1 to VDEn (see FIG. 2) and the second power supply voltage wiring lines VSM and VSE1 to VSEn (see FIG. 2) in a second case where display is performed in the display region DA based on the second image data, the control circuit 53 controlling the adjustment circuit outputs a control signal for controlling the adjustment circuit via the control signal lines CL1 to CLn so that the value of a current flowing through the adjustment elements (for example, non-light emitting diodes DI shown in FIG. 5) in the first case is larger than the value of a current flowing through the adjustment elements (for example, the non-light emitting diodes DI shown in FIG. 5) in the second case.

When a plurality of adjustment circuits DSC are provided (see FIG. 2) as in the present embodiment, the sum of values of currents flowing through the adjustment elements (for example, the non-light emitting diodes DI shown in FIG. 5) provided in each of the plurality of adjustment circuits DSC is larger in the first case than in the second case.

The display control circuit 55 can generate the second write data based on the input image signal (image data) IVD to be input, as follows. The display control circuit 55 can generate the second write data based on, for example, a total value of gray scale values of the subpixels in the display region DA which is calculated from the input image signal (image data) IVD for one screen of the display region DA to be input. The total value of the gray scale values of the subpixels of the display region DA is a value obtained by calculating the sum of the gray scale values of the subpixels in the display region DA from the input image signal (image data) IVD for one screen of the display region DA. A total value of gray scale values of the subpixels in the display region DA in the first case where display is performed in the display region DA based on the first image data is smaller than a total value of gray scale values of the subpixels in the display region DA in the second case where display is performed in the display region DA based on the second image data, and the amount of current flowing through the first power supply voltage wiring lines VDM and VDE1 to VDEn (see FIG. 2) and the second power supply voltage wiring lines VSM and VSE1 to VSEn (see FIG. 2) in the first case is smaller than the amount of current flowing through the first power supply voltage wiring lines VDM and VDE1 to VDEn (see FIG. 2) and the second power supply voltage wiring lines VSM and VSE1 to VSEn (see FIG. 2) in the second case.

When the control circuit 53 controlling the adjustment circuit generates the second write data, the control circuit 53 controlling the adjustment circuit can generate the second write data based on the input image signal (image data) IVD that is input in the same manner as described above.

Figure 6:
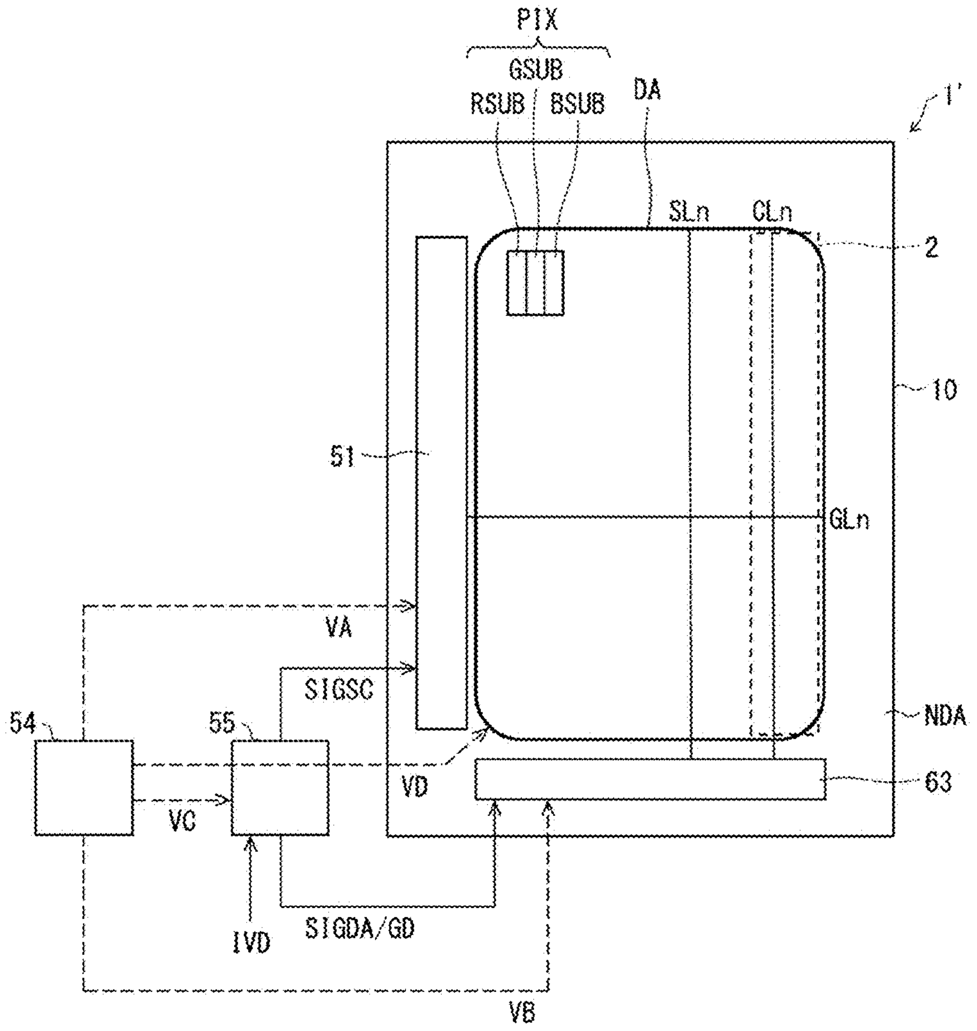
FIG. 6 is a plan view showing a schematic configuration of a display device that is a modification example of the first embodiment and includes a data-side drive circuit including a control circuit that controls an adjustment circuit.

FIG. 6 is a plan view showing a schematic configuration of a display device 1' according to a modification example of the first embodiment, in which the display device 1' includes a data-side drive circuit 63 including a control circuit controlling an adjustment circuit.

As shown in FIG. 6, the display device 1' includes a display control circuit 55 and the data-side drive circuit 63 including the control circuit controlling the adjustment circuit, and the data-side drive circuit and the control circuit controlling the adjustment circuit are integrated.

Based on an input image signal IVD, the display control circuit 55 provided in the display device 1' shown in FIG. 6 generates data (first write data) of an appropriate voltage value for performing control so that each of the red light-emitting element provided in the red subpixel RSUB, the green light-emitting element provided in the green subpixel GSUB, and the blue light-emitting element provided in the blue subpixel BSUB included in the display region DA of the display device 1 emits light at a predetermined luminance. Further, the display control circuit 55 generates data (second write data) of an appropriate voltage value for controlling the adjustment circuit based on the input image signal IVD.

The data-side drive circuit 63 including the control circuit controlling the adjustment circuit which is provided in the display device 1' shown in FIG. 6 outputs the first write data in the write data GD supplied from the display control circuit 55 as a data signal via the data signal line SLn based on the data-side control signal SIGDA supplied from the display control circuit 55, and outputs the second write data in the write data GD supplied from the display control circuit 55 as a control signal for controlling the adjustment circuit via the control signal line CLn based on the data-side control signal SIGDA supplied from the display control circuit 55.

Figure 2:
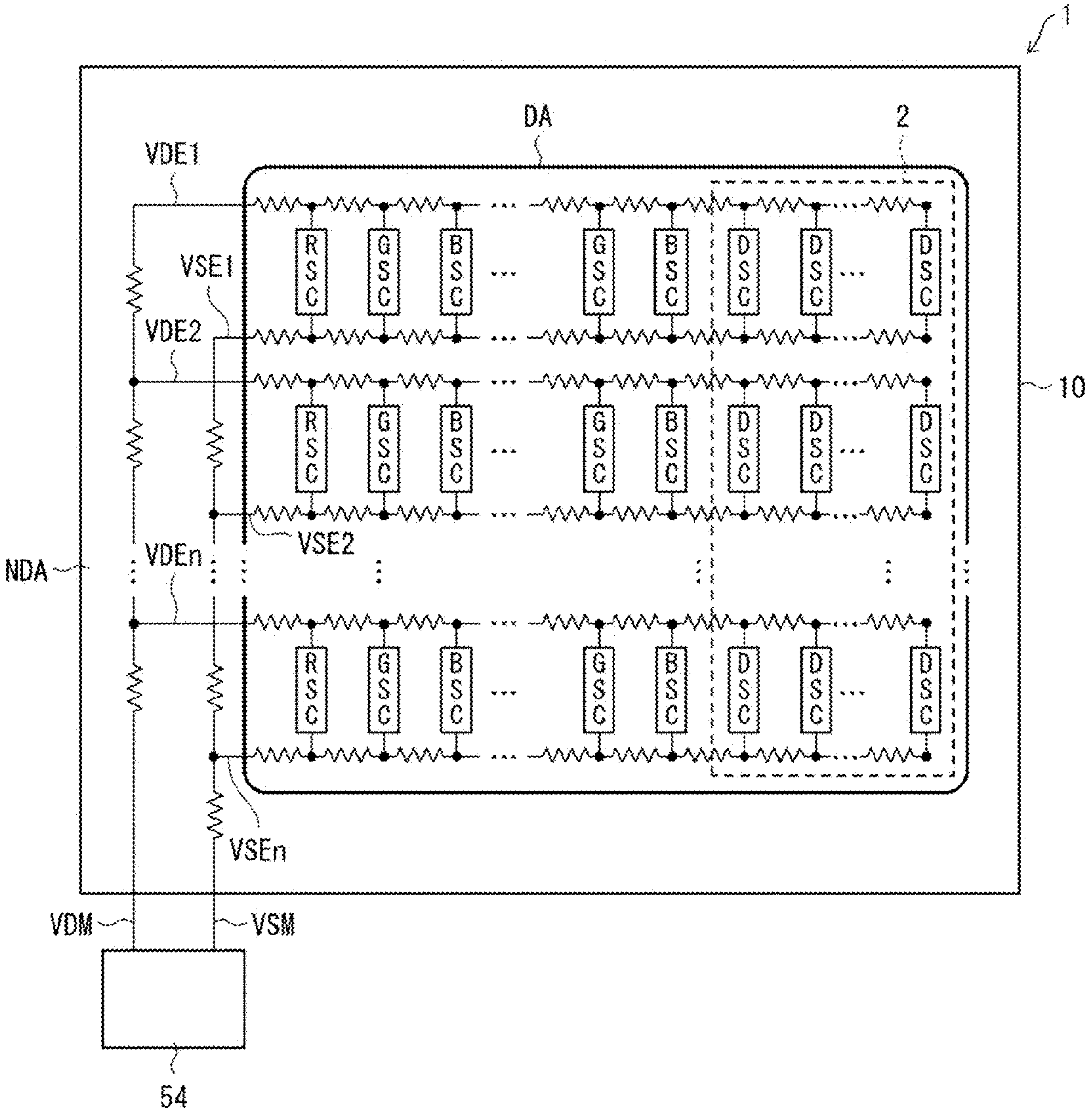
FIG. 2 is a circuit diagram including first power supply voltage wiring lines, second power supply voltage wiring lines, subpixel circuits, and adjustment circuits including switching elements and adjustment elements, which are provided in the display device according to the first embodiment shown in FIG. 1.

FIG. 2 is a circuit diagram including first power supply voltage wiring lines VDM and VDE1 to VDEn, second power supply voltage wiring lines VSM and VSE1 to VSEn, subpixel circuits (pixel circuits) RSC, GSC, and BSC, and adjustment circuits DSC including switching elements and adjustment elements, which are provided in the display device 1 shown in FIG. 1.

As shown in FIG. 2, the adjustment circuit DSC includes the switching elements and the adjustment elements, and is connected to the first power supply voltage wiring lines VDM and VDE1 to VDEn and the second power supply voltage wiring lines VSM and VSE1 to VSEn. The control circuit 53 controlling the adjustment circuit shown in FIG. 1 controls current values of the adjustment elements included in the adjustment circuit DSC in accordance with the input image signal (image data) IVD in response to control signals for controlling the adjustment circuit which are output via the control signal lines CL1 to CLn.

As shown in FIG. 2, the first power supply voltage wiring lines VDM and VDE1 to VDEn include a first power supply voltage trunk wiring line VDM electrically connected to the power supply circuit 54 and extending in the up-down direction in the drawing, and a plurality of first power supply voltage branch wiring lines VDE1 to VDEn electrically connected to the first power supply voltage trunk wiring line VDM and extending in the right-left direction in the drawing. The second power supply voltage wiring lines VSM and VSE1 to VSEn include a second power supply voltage trunk wiring line VSM electrically connected to the power supply circuit 54 and extending in the up-down direction in the drawing, and a plurality of second power supply voltage branch wiring lines VSE1 to VSEn electrically connected to the second power supply voltage trunk wiring line VSM and extending in the right-left direction in the drawing. A power supply voltage lower than that for the first power supply voltage wiring lines VDM and VDE1 to VDEn is supplied from the power supply circuit 54 to the second power supply voltage wiring lines VSM and VSE1 to VSEn. That is, the low-level power supply voltage ELVSS (low potential side power supply) is supplied from the power supply circuit 54 to the second power supply voltage wiring lines VSM and VSE1 to VSEn, and the high-level power supply voltage ELVDD (high potential side power supply) is supplied from the power supply circuit 54 to the first power supply voltage wiring lines VDM and VDE1 to VDEn.

The resistors shown in the first power supply voltage wiring lines VDM and VDE1 to VDEn and the second power supply voltage wiring lines VSM and VSE1 to VSEn in FIG. 2 do not mean resistance elements but mean wiring line resistances. The same applies to resistors shown in the first power supply voltage wiring lines VDM and VDE1 to VDEn and the second power supply voltage wiring lines VSM and VSE1 to VSEn in each of FIG. 9 to FIG. 21 to be described later.

The red subpixel circuit RSC is electrically connected to each of the first power supply voltage wiring lines VDM and VDE1 to VDEn and the second power supply voltage wiring lines VSM and VSE1 to VSEn, and includes a red light-emitting element provided in the red subpixel RSUB shown in FIG. 1. The green subpixel circuit GSC is electrically connected to each of the first power supply voltage wiring lines VDM and VDE1 to VDEn and the second power supply voltage wiring lines VSM and VSE1 to VSEn, and includes a green light-emitting element provided in the green subpixel GSUB shown in FIG. 1. The blue subpixel circuit BSC is electrically connected to each of the first power supply voltage wiring lines VDM and VDE1 to VDEn and the second power supply voltage wiring lines VSM and VSE1 to VSEn, and includes a blue light-emitting element provided in the blue subpixel BSUB shown in FIG. 1.

In the display device 1 according to the present embodiment, as shown in FIG. 2, a first set of branch wiring lines that include the branch wiring line VDE1 of the first power supply voltage wiring line electrically connected to the trunk wiring line VDM of the first power supply voltage wiring line and the branch wiring line VSE1 of the second power supply voltage wiring line electrically connected to the trunk wiring line VSM of the second power supply voltage wiring line, a second set of branch wiring lines that include the branch wiring line VDE2 of the first power supply voltage wiring line electrically connected to the trunk wiring line VDM of the first power supply voltage wiring line and the branch wiring line VSE2 of the second power supply voltage wiring line electrically connected to the trunk wiring line VSM of the second power supply voltage wiring line, and an n-th set of branch wiring lines that include the branch wiring line VDEn of the first power supply voltage wiring line electrically connected to the trunk wiring line VDM of the first power supply voltage wiring line and the branch wiring line VSEn of the second power supply voltage wiring line electrically connected to the trunk wiring line VSM of the second power supply voltage wiring line are sequentially arranged in the direction of a starting point from a position farthest from the starting point at which a high potential side power supply and a low potential side power supply are supplied in each of the trunk wiring line VDM of the first power supply voltage wiring line and the trunk wiring line VSM of the second power supply voltage wiring line. In each of the n sets of branch wiring lines, each of the adjustment circuit DSC and the subpixel circuits (pixel circuits) RSC, GSC, and BSC is disposed between the branch wiring line of the first power supply voltage wiring line and the branch wiring line of the second power supply voltage wiring line and is connected to each of the branch wiring line of the first power supply voltage wiring line and the branch wiring line of the second power supply voltage wiring line. A case where, in each of the n sets of branch wiring lines, the subpixel circuits (pixel circuits) RSC, GSC, and BSC are provided between a first region in which the trunk wiring line of the first power supply voltage wiring line and the trunk wiring line of the second power supply voltage wiring line are formed and a second region in which the adjustment circuits DSC are formed is described as an example, but the disclosure is not limited thereto.

As shown in FIG. 2, the red subpixel circuit RSC, the green subpixel circuit GSC, the blue subpixel circuit BSC, and the adjustment circuit DSC are connected in parallel to the first power supply voltage wiring lines VDM and VDE1 to VDEn and the second power supply voltage wiring lines VSM and VSE1 to VSEn, respectively. The adjustment circuit DSC includes adjustment elements connected in parallel to the first power supply voltage wiring lines VDM and VDE1 to VDEn and the second power supply voltage wiring lines VSM and VSE1 to VSEn, and switching elements.

In the present embodiment, a case where the plurality of adjustment circuits DSC are provided in the display region DA and in a region near the right end portion of the display region DA will be described as an example, but the disclosure is not limited thereto. By providing the plurality of adjustment circuits DSC in the display region DA as in the present embodiment, the subpixel circuits RSC, GSC, and BSC and the adjustment circuit DSC provided in the display region DA can be formed in the same manufacturing process using the same mask, and thus the number of manufacturing steps can be reduced. When the plurality of adjustment circuits DSC are provided in the display region DA, the region in which the plurality of adjustment circuits DSC are provided becomes a non-display region in the display region DA. Thus, for example, a ratio of the area of the region 2 in which the adjustment circuits DSC indicated by a dotted line in FIG. 2 are formed to the area of the display region DA is preferably 10% or less and more preferably 5% or less in consideration of the influence of a loss of the display region. The ratio of the area of the region 2 in which the adjustment circuits DSC are formed to the area of the display region DA can be reduced by, for example, reducing at least one of the number of the adjustment circuits DSC and the size of the adjustment circuit DSC.

Further, in the present embodiment, as described above, in each of all of the n sets of branch wiring lines, the plurality of subpixel circuits RSC, GSC, and BSC are provided between the first region in which the first power supply voltage trunk wiring line VDM of the first power supply voltage wiring lines VDM, VDE1 to VDEn and the second power supply voltage trunk wiring line VSM of the second power supply voltage wiring lines VSM, VSE1 to VSEn are formed and the region 2 (second region) in which the adjustment circuits DSC are formed. Thus, the plurality of subpixel circuits RSC, GSC, and BSC can be provided to be closer to the first region in which the first power supply voltage trunk wiring line VDM and the second power supply voltage trunk wiring line VSM are formed than the region 2 (second region) in which the adjustment circuits DSC are formed. Thus, it is possible to reduce the influence of wiring line resistance in a light-emitting region (a region in which the subpixel circuits RSC, GSC, and BSC including the light-emitting elements are provided) in the display region DA, and it is possible to minimize the influence of a voltage drop in the light-emitting region in the display region DA. On the other hand, the region 2 (second region) in which the adjustment circuits DSC are formed is disposed farther from the first region in which the first power supply voltage trunk wiring line VDM and the second power supply voltage trunk wiring line VSM are formed than the plurality of subpixel circuits RSC, GSC, and BSC, and thus the region 2 (second region) in which the adjustment circuits DSC are formed is more easily affected by a voltage drop. Thus, in the region 2 (second region) in which the adjustment circuits DSC are formed, when it is necessary to sufficiently secure the amount of current flowing through the adjustment elements of the adjustment circuits DSC provided between the first power supply voltage branch wiring lines VDE1 to VDEn of the first power supply voltage wiring lines VDM and VDE1 to VDEn and the second power supply voltage branch wiring lines VSE1 to VSEn of the second power supply voltage wiring lines VSM and VSE1 to VSEn, the number of adjustment circuits DSC including the adjustment elements may be increased, resistance values of the adjustment elements included in the adjustment circuits DSC may be decreased without changing the number of adjustment circuits DSC including the adjustment elements, or the number of adjustment circuits DSC including the adjustment elements may be increased and the resistance values of the adjustment elements included in the adjustment circuits DSC may be decreased in consideration of the arrangement relationship shown in FIG. 2.

Figure 3:
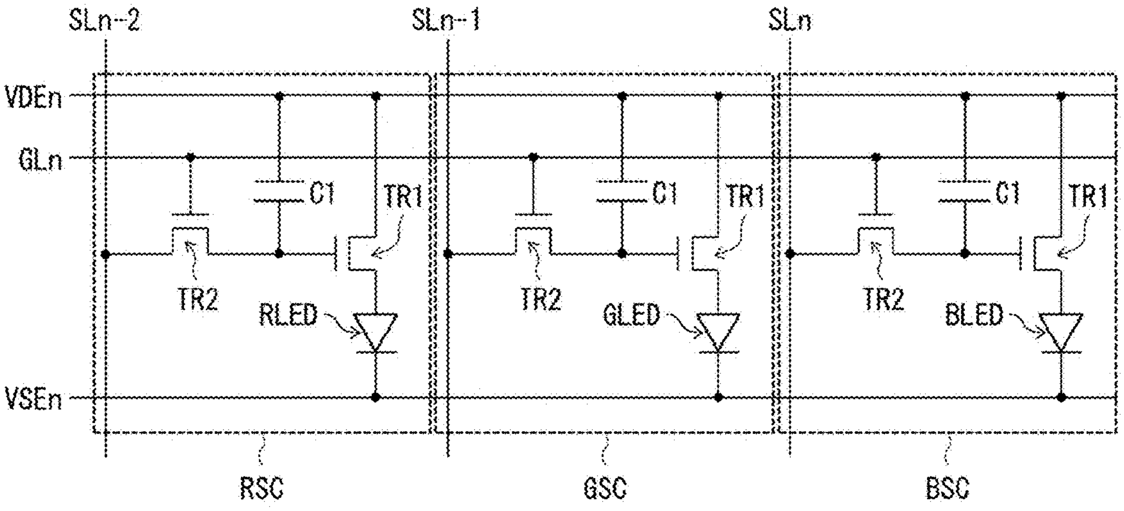
FIG. 3 is a circuit diagram showing subpixel circuits provided in the display device according to the first embodiment.

FIG. 3 is a circuit diagram showing the subpixel circuits RSC, GSC, and BSC provided in the display device 1 shown in FIG. 1.

The red subpixel circuit RSC is electrically connected to each of the first power supply voltage branch wiring line VDEn of the first power supply voltage wiring lines VDM and VDE1 to VDEn and the second power supply voltage branch wiring line VSEn of the second power supply voltage wiring lines VSM and VSE1 to VSEn, and includes two transistors TR1 to TR2, one holding capacitor (capacitor) C1, and the red light-emitting element RLED provided in the red subpixel RSUB shown in FIG. 1. A drain electrode of the transistor TR1, which is a drive transistor, is electrically connected to an electrode on one side of the red light-emitting element RLED, and a gate electrode of the transistor TR1 is electrically connected to an electrode on one side of the holding capacitor C1 and a drain electrode of the transistor TR2, which is a selecting transistor. A source electrode of the transistor TR1 and an electrode on the other side of the holding capacitor C1 are electrically connected to the branch wiring line VDEn of the first power supply voltage wiring lines VDM and VDE1 to VDEn to which the high-level power supply voltage ELVDD is supplied from a power supply circuit (not shown). An electrode on the other side of the red light-emitting element RLED is electrically connected to the branch wiring line VSEn of the second power supply voltage wiring lines VSM and VSE1 to VDEn to which the low-level power supply voltage ELVSS is supplied from a power supply circuit (not shown). In addition, a source electrode of the transistor TR2, which is a selecting transistor, is electrically connected to a data signal line SLn-2 to which a data signal output from a data-side drive circuit (not shown) is supplied, a gate electrode of the transistor TR2 is electrically connected to a scanning signal line GLn to which a scanning signal output from a scanning-side drive circuit (not shown) is supplied, and a drain electrode of the transistor TR2 is electrically connected to a gate electrode of the transistor TR1 and an electrode on one side of the holding capacitor C1. According to the red subpixel circuit RSC having such a configuration, a data signal having a voltage corresponding to a predetermined gray scale value which is supplied to the source electrode of the transistor TR2 via a data signal line SLn-2 is written in the holding capacitor C1 during a writing period in which the scanning signal supplied to the scanning signal line GLn is at a high level, that is, during a period in which the transistor TR2 is turned on, a voltage is applied to the gate electrode of the transistor TR1 based on the voltage written in the holding capacitor C1 during a light emission period in which the scanning signal supplied to the scanning signal line GLn is at a low level, that is, during a period in which the transistor TR2 is turned off, and a predetermined current flows to the red light-emitting element RLED, whereby it is possible to cause the red light-emitting element RLED to emit light at a luminance corresponding to a predetermined gray scale value.

The green subpixel circuit GSC is electrically connected to each of the branch wiring line VDEn of the first power supply voltage wiring lines VDM and VDE1 to VDEn and the branch wiring line VSEn of the second power supply voltage wiring lines VSM and VSE1 to VSEn, and includes two transistors TR1 to TR2, one holding capacitor C1, and the green light-emitting element GLED provided in the green subpixel GSUB shown in FIG. 1. According to the green subpixel circuit GSC having such a configuration, a data signal having a voltage corresponding to a predetermined gray scale value which is supplied to the source electrode of the transistor TR2 via a data signal line SLn-1 is written in the holding capacitor C1 during a writing period in which a scanning signal supplied to the scanning signal line GLn is at a high level, that is, during a period in which the transistor TR2 is turned on, a voltage is applied to the gate electrode of the transistor TR1 based on the voltage written in the holding capacitor C1 during a light emission period in which the scanning signal supplied to the scanning signal line GLn is at a low level, that is, during a period in which the transistor TR2 is turned off, and a predetermined current flows to the green light-emitting element GLED, whereby it is possible to cause the green light-emitting element GLED to emit light at a luminance corresponding to a predetermined gray scale value.

The blue subpixel circuit BSC is electrically connected to each of the branch wiring line VDEn of the first power supply voltage wiring lines VDM and VDE1 to VDEn and the branch wiring line VSEn of the second power supply voltage wiring lines VSM and VSE1 to VSEn, and includes two transistors TR1 to TR2, one holding capacitor C1, and the blue light-emitting element BLED provided in the blue subpixel BSUB shown in FIG. 1. According to the blue subpixel circuit BSC having such a configuration, a data signal having a voltage corresponding to a predetermined gray scale value which is supplied to the source electrode of the transistor TR2 via the data signal line SLn is written in the holding capacitor C1 during a writing period in which a scanning signal supplied to the scanning signal line GLn is at a high level, that is, during a period in which the transistor TR2 is turned on, a voltage is applied to the gate electrode of the transistor TR1 based on the voltage written in the holding capacitor C1 during a light emission period in which the scanning signal supplied to the scanning signal line GLn is at a low level, that is, during a period in which the transistor TR2 is turned off, and a predetermined current flows to the blue light-emitting element BLED, whereby it is possible to cause the blue light-emitting element BLED to emit light at a luminance corresponding to a predetermined gray scale value.

In each of the red subpixel circuit RSC, the green subpixel circuit GSC, and the blue subpixel circuit BSC shown in FIG. 3, the amount of current flowing through the branch wiring line VDEn of the first power supply voltage wiring lines VDM and VDE1 to VDEn and the branch wiring line VSEn of the second power supply voltage wiring lines VSM and VSE1 to VSEn increases as a data signal supplied to the source electrode of the transistor TR2 via the data signal lines SLn-2 to SLn has a higher voltage corresponding to a higher gray scale value.

Each of the red light-emitting element RLED, the green light-emitting element GLED, and the blue light-emitting element BLED may be a quantum dot light emitting diode (QLED) including a light-emitting layer containing quantum dots, or may be an organic light emitting diode (OLED) including an organic light-emitting layer.

Figure 4:
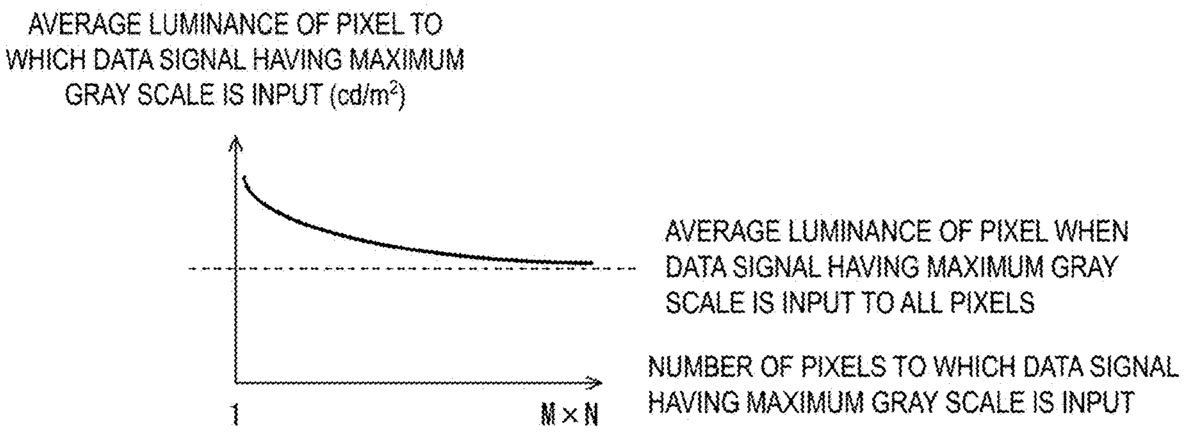
FIG. 4 is a diagram showing a tendency that the actual light emission luminance of each light-emitting element that emits light based on a maximum gray scale value decreases as the number of light-emitting elements that emit light based on the maximum gray scale value increases in a case where a control circuit provided in the display device according to the first embodiment is not driven.

FIG. 4 is a diagram showing a tendency that the actual light emission luminance of each light-emitting element emitting light based on a maximum gray scale value (for example, a 255 gray scale among a 0 to 255 gray scale) decreases as the number of light-emitting elements emitting light increases when the control circuit 53 controlling the adjustment circuit provided in the display device 1 is not driven, a light-emitting element that is turned on is emitting light at a maximum gray scale value (for example, a 255 gray scale among a 0 to 255 gray scale), and a light-emitting element that is not turned on is emitting light at a 0 gray scale, that is, not emitting light.

In FIG. 4, a pixel to which a data signal having a maximum gray scale is input means a pixel including a red subpixel RSUB, a green subpixel GSUB, and a blue subpixel BSUB, in which each of a red light-emitting element RLED included in the red subpixel RSUB, a green light-emitting element GLED included in the green subpixel GSUB, and a blue light-emitting element BLED included in the blue subpixel BSUB is caused to emit light based on a data signal having a maximum gray scale.

As shown in FIG. 4, when a data signal having a maximum gray scale is input to only one pixel PIX among M× N (M and N are natural numbers of 100 or more) pixels PIX provided in the display region DA of the display device 1 and a data signal having a minimum gray scale (for example, a 0 gray scale among a 0 to 255 gray scale), that is, a data signal of black display is input to the remaining pixels PIX, the luminance of one pixel PIX to which the data signal having a maximum gray scale is input is high. On the other hand, as the number of pixels PIX to which a data signal having a maximum gray scale is input increases, an average luminance of the pixels PIX to which a data signal having a maximum gray scale is input gradually decreases, and as indicated by a dotted line in the drawing, it can be understood that, when a data signal having a maximum gray scale is input to all of the M× N pixels PIX, an average luminance of the pixels PIX to which a data signal having a maximum gray scale is input significantly decreases.

Such a tendency is caused by the following reason. When the number of pixels PIX to which a data signal having a maximum gray scale is input is increased, the amount of current flowing through the first power supply voltage wiring lines VDM and VDE1 to VDEn and the second power supply voltage wiring lines VSM and VSE1 to VSEn is also increased, resulting in an increase in a voltage drop $\Delta V$ (=I×R), a decrease in a voltage applied to the holding capacitor C1 shown in FIG. 3, and a decrease in a voltage applied to the gate electrode of the transistor TR1. Thus, the amount of current flowing through each of the red light-emitting element RLED, the green light-emitting element GLED, and the blue light-emitting element BLED decreases, and a light emission luminance decreases.

Although a tendency that a light emission luminance decreases has been described in FIG. 4 by taking a case where a data signal having a maximum gray scale (for example, a 255 gray scale among a 0 to 255 gray scale) is input as an example, a light emission luminance tends to decrease also, for example, when a data signal having an intermediate gray scale (for example, a 128 gray scale among a 0 to 255 gray scale) is input or when a data signal having a low gray scale (for example, a 50 gray scale among a 0 to 255 gray scale) is input, although the degree of decrease in light emission luminance is smaller.

Figure 5:
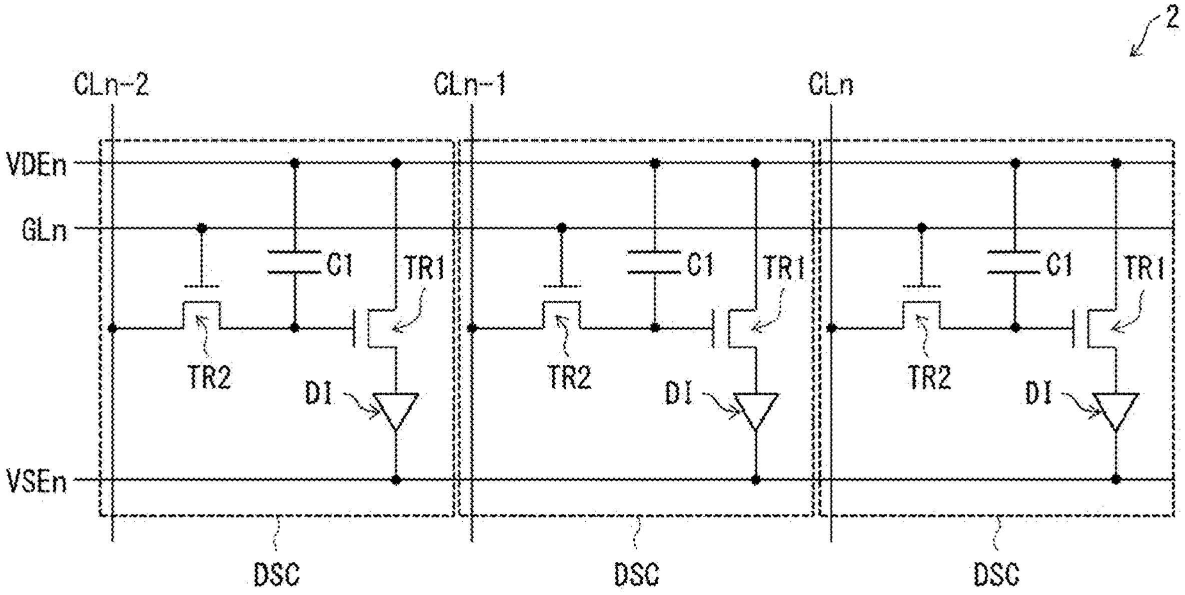
FIG. 5 is a circuit diagram showing the adjustment circuit provided in the display device according to the first embodiment shown in FIG. 1.

Consequently, in the display device 1, an adjustment circuit DSC shown in FIG. 5 is controlled using the control circuit 53 controlling the adjustment circuit shown in FIG. 1, and thus it is possible to realize the display device 1 in which the occurrence of a large difference in the actual light emission luminance of each light-emitting element between a case where a lighting rate is high and a case where a lighting rate is low is suppressed when one or more light-emitting elements are caused to emit light based on the same gray scale value. Here, the lighting rate is obtained from the following Equation 1 on the assumption that each of all of the light-emitting elements included in the display device 1 can take only one of a first state in which light is emitted at a maximum gray scale value (for example, a 255 gray scale among a 0 to 255 gray scale) and a second state in which light is emitted at a 0 gray scale, that is, light is not emitted.

Lighting rate=(number of light-emitting elements emitting light at maximum gray scale/number of all light-emitting elements provided in display device 1)×100% (Equation 1)

FIG. 5 is a circuit diagram showing the adjustment circuit DSC provided in the display device 1. FIG. 5 is a diagram showing a part of the region 2 in which the adjustment circuit DSC shown in FIG. 2 is formed.

As shown in FIG. 5, the adjustment circuit DSC includes a transistor TR1 and a transistor TR2 as switching elements, and a non-light emitting diode DI as an adjustment element. In the present embodiment, a case where two transistors TR1 and TR2 are provided as switching elements is described as an example, but the disclosure is not limited thereto, and the adjustment circuit DSC may include only the transistor TR1 as a switching element. Furthermore, the switching element is not limited to a transistor as long as it is an element capable of turning on and turning off electrical connection. Further, in the present embodiment, a case where a non-light emitting diode DI is provided as an adjustment element is described as an example, but the disclosure is not limited thereto, and the adjustment element may be, for example, a resistor (resistance element), and the adjustment element may be a diode other than the non-light emitting diode DI, for example, a light emitting diode. When the adjustment element is a light emitting diode, it is preferable to separately provide a light shielding layer for shielding light from the light emitting diode.

As described above, the display control circuit 55 shown in FIG. 1 generates the second write data based on a total value of gray scale values of the subpixels in the display region DA which is calculated from the input image signal (image data) IVD for one screen of the display region DA to be input, and the control circuit 53 controlling the adjustment circuit shown in FIG. 1 supplies the second write data to the adjustment circuits DSC via the control signal lines CL1 to CLn as a control signal for controlling the adjustment circuit to control the adjustment circuit DSC.

In the present embodiment, as shown in FIG. 2, n rows and m columns, that is, n×m adjustment circuits DSC, are provided in the region 2 in which the adjustment circuits DSC are formed, and the adjustment elements provided in the n×m adjustment circuits DSC are connected in parallel to the first power supply voltage wiring lines VDM and VDE1 to VDEn and the second power supply voltage wiring lines VSM and VSE1 to VSEn.

In the present embodiment, the display control circuit 55 generates low-level second write data, for example, when the total value of the gray scale values of the subpixels in the display region DA which is calculated from the input image signal (image data) IVD for one screen of the display region DA to be input is equal to or greater than a predetermined value (for example, equal to or greater than 255×Z(Z is a total number of subpixels)), and the control circuit 53 controlling the adjustment circuit supplies the low-level second write data to the adjustment circuits DSC via the control signal lines CL1 to CLn as a control signal for controlling the adjustment circuit, whereby it is possible to prevent a current from flowing through the non-light emitting diode DI, which is an adjustment element, in each of the n×m adjustment circuits DSC. In addition, the display control circuit 55 generates low-level second write data, for example, when the total value of the gray scale values of the subpixels in the display region DA which is calculated from the input image signal (image data) IVD for one screen of the display region DA to be input is 0, and the control circuit 53 controlling the adjustment circuit supplies the low-level second write data to the adjustment circuits DSC via the control signal lines CL1 to CLn as a control signal for controlling the adjustment circuit, and thus a current may be prevented from flowing through the non-light emitting diode DI, which is an adjustment element, in each of the n×m adjustment circuits DSC.

On the other hand, in the present embodiment, the display control circuit 55 divides the range of the total value into n×m regions when the total value of gray scale values of the subpixels in the display region DA which is calculated from the input image signal (image data) IVD for one screen of the display region DA to be input is equal to or greater than 255 and less than 255×Z(Z is a total number of subpixels), and generates low-level second write data and high-level second write data so that the number of adjustment circuits DSC in which a current does not flow through a non-light emitting diode DI, which is an adjustment element, increases in a region to which a larger total value belongs, and the control circuit 53 controlling the adjustment circuit supplies the low-level second write data and the high-level second write data to the adjustment circuits DSC via the control signal lines CL1 to CLn as a control signal for controlling the adjustment circuit. For example, in a region to which the smallest total value belongs, the display control circuit 55 generates high-level second write data so that a current flows through a non-light emitting diode DI, which is an adjustment element, in each of the n×m adjustment circuits DSC, and the control circuit 53 controlling the adjustment circuit supplies the high-level second write data to the adjustment circuits DSC via the control signal lines CL1 to CLn as a control signal for controlling the adjustment circuit. Further, for example, the display control circuit 55 generates low-level second write data and high-level second write data so that a current flows through a non-light emitting diode DI, which is an adjustment element, in one adjustment circuit DSC in a region to which the largest total value belongs, and the control circuit 53 controlling the adjustment circuit supplies the low-level second write data and the high-level second write data to the adjustment circuits DSC via the control signal lines CL1 to CLn as a control signal for controlling the adjustment circuit.

Figure 7:
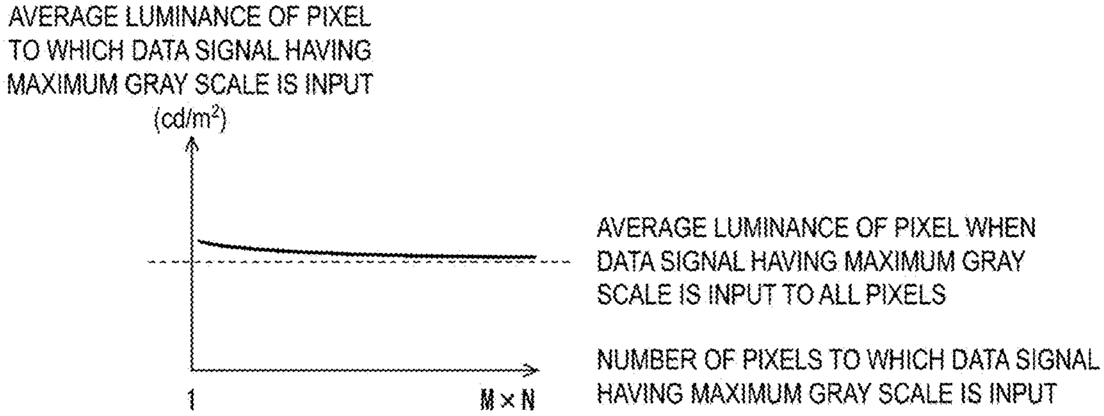
FIG. 7 is a diagram showing that, in the display device according to the first embodiment shown in FIG. 1, when one or more light-emitting elements are caused to emit light based on a maximum gray scale value which is the same gray scale value, occurrence of a large difference in the actual light emission luminance of each light-emitting element between the case of a high lighting rate and the case of a low lighting rate is suppressed.

FIG. 7 is a diagram showing that, in the display device 1, when one or more light-emitting elements are caused to emit light based on a maximum gray scale value which is the same gray scale value, occurrence of a large difference in the actual light emission luminance of each light-emitting element between the case of a high lighting rate and the case of a low lighting rate is suppressed.

In FIG. 7, a pixel to which a data signal having a maximum gray scale is input means a pixel including a red subpixel RSUB, a green subpixel GSUB, and a blue subpixel BSUB, in which each of a red light-emitting element RLED included in the red subpixel RSUB, a green light-emitting element GLED included in the green subpixel GSUB, and a blue light-emitting element BLED included in the blue subpixel BSUB is caused to emit light based on a data signal having a maximum gray scale.

When a data signal having a maximum gray scale is input to only one pixel PIX among M× N (M and N are natural numbers of 100 or more) pixels PIX provided in the display region DA of the display device 1 and a data signal having a minimum gray scale, that is, a data signal of black display, is input to the remaining pixels PIX, the luminance of one pixel PIX to which the data signal having a maximum gray scale is input, that is, an average luminance of the pixels to which the data signal having a maximum gray scale is input, is inherently high as shown in FIG. 4. However, in the present embodiment, in such a case, as described above, the display control circuit 55 generates high-level second write data so that a current flows through a non-light emitting diode DI, which is an adjustment element, in each of the n×m adjustment circuits DSC, and the control circuit 53 controlling the adjustment circuit supplies the second write data to the adjustment circuits DSC via the control signal lines CL1 to CLn as a control signal for controlling the adjustment circuit. Thus, the amount of current flowing through the first power supply voltage wiring lines VDM and VDE1 to VDEn and the second power supply voltage wiring lines VSM and VSE1 to VSEn increases, and consequently, a voltage drop ΔV (=I×R) increases, and thus a voltage applied to the holding capacitor C1 shown in FIG. 3 decreases, and a voltage applied to the gate electrodes of the transistors TR1 decreases. Thus, the amount of current flowing through each of the red light-emitting element RLED, the green light-emitting element GLED, and the blue light-emitting element BLED decreases, and a light emission luminance can be reduced.

On the other hand, as shown in FIG. 4 showing a case where no adjustment element is provided, as the number of pixels PIX to which a data signal having a maximum gray scale is input increases, an average luminance of the pixels PIX to which a data signal having a maximum gray scale is input gradually decreases. Thus, in the present embodiment, in such a case, as described above, the display control circuit 55 generates low-level second write data and high-level second write data so that the number of adjustment circuits DSC through which no current flows increases in the n×m adjustment circuits DSC, and the control circuit 53 controlling the adjustment circuit supplies the second write data to the adjustment circuits DSC via the control signal lines CL1 to CLn as a control signal for controlling the adjustment circuit. Thus, as shown in FIG. 7, even when the number of pixels PIX to which the data signal having a maximum gray scale is input increases, the luminance of one pixel PIX to which the data signal having a maximum gray scale is input, that is, an average luminance of the pixels to which the data signal having a maximum gray scale is input, can be maintained substantially uniform.

As described above, according to the display device 1, when one or more light-emitting elements emit light based on the same gray scale value, it is possible to prevent a large difference from occurring in the actual light emission luminance of each light-emitting element between the case of a high lighting rate and the case of a low lighting rate.

Such a display device 1 can be more suitably used in, for example, the field of a large-sized display device, the field of a display device that mainly displays a moving image or a still image with slow movement, the field of a medical display device that frequently enlarges or reduces an image, and the like.

In addition, according to the display device 1, as shown in FIG. 5, the non-light emitting diodes DI, which are adjustment elements, are connected in parallel to the first power supply voltage wiring lines VDM and VDE1 to VDEn and the second power supply voltage wiring lines VSM and VSE1 to VSEn, which does not result in an unnecessary increase in a combined resistance related to the first power supply voltage wiring lines VDM and VDE1 to VDEn and the second power supply voltage wiring lines VSM and VSE1 to VSEn.

In addition, according to the display device 1, as shown in FIG. 5, the non-light emitting diodes DI, which are adjustment elements, are connected in parallel to the first power supply voltage wiring lines VDM and VDE1 to VDEn and the second power supply voltage wiring lines VSM and VSE1 to VSEn, and thus, for example, even when a problem occurs in one of the adjustment elements, it does not cause a problem in the entire display device 1, and thus the yield of the display device 1 does not decrease.

Further, in the present embodiment, portions other than the non-light emitting diodes DI which are the adjustment elements of the adjustment circuits DSC, shown in FIG. 5, provided in the display device 1 are the same as portions other than the light-emitting elements (the red light-emitting element RLED, the green light-emitting element GLED, and the blue light-emitting element BLED) of the red subpixel circuit RSC, the green subpixel circuit GSC, and the blue subpixel circuit BSC, shown in FIG. 3, provided in the display device 1. Thus, the adjustment circuit DSC can be formed relatively easily by using the steps of forming the red subpixel circuit RSC, the green subpixel circuit GSC, and the blue subpixel circuit BSC.

In the present embodiment, an example in which the display device 1 includes the red subpixel circuit RSC, the green subpixel circuit GSC, and the blue subpixel circuit BSC shown in FIG. 3 and the adjustment circuit DSC shown in FIG. 5 is described as an example, but the disclosure is not limited thereto. As will be described later, the display device 1 may include, for example, another subpixel circuit shown in (a) of FIG. 8 instead of the red subpixel circuit RSC, the green subpixel circuit GSC, and the blue subpixel circuit BSC shown in FIG. 3, and may include, for example, another adjustment circuit shown in (b) of FIG. 8 instead of the adjustment circuit DSC shown in FIG. 5.

(a) of FIG. 8 is a diagram showing another subpixel circuit BSC' that can be provided in the display device 1, and (b) of FIG. 8 is a diagram showing another adjustment circuit DSC' that can be provided in the display device 1.

As shown in (a) of FIG. 8, the blue subpixel drive circuit BSC' includes a blue light-emitting element BLED, seven transistors T1 to T7, and one holding capacitor C1. The transistor T1 is a first initialization transistor, the transistor T2 is a threshold compensation transistor, the transistor T3 is a write control transistor, the transistor T4 is a drive transistor, the transistor T5 is a first light emission control transistor, the transistor T6 is a second light emission control transistor, and the transistor T7 is a second initialization transistor.

A scanning signal output from a unit circuit at an n-th stage of the scanning-side drive circuit 51 is supplied to a gate electrode of the transistor T2, a gate electrode of the transistor T3, and a gate electrode of the transistor T7 via the scanning signal line GLn. In addition, a scanning signal output from a unit circuit at an n−1-th stage of the scanning-side drive circuit 51 is supplied to a gate electrode of the transistor T1 via the scanning signal line GLn-1. In addition, a light emission control signal output from a unit circuit at an n-th stage of a light emission control circuit (emission driver) (not shown) is supplied to a gate electrode of the transistor T5 and a gate electrode of the transistor T6 via a light emission control line EMn. In addition, the high-level power supply voltage ELVDD is supplied from the power supply circuit 54 via the branch wiring line VDEn of the first power supply voltage wiring lines VDM and VDE1 to VDEn, the low-level power supply voltage ELVSS is supplied from the power supply circuit 54 via the branch wiring line VSEn of the second power supply voltage wiring lines VSM and VSE1 to VSEn, and the initialization voltage is supplied from the power supply circuit 54 via an initialization voltage line Vini. Further, a data signal input to a source electrode of the transistor T3 is a signal output from the data-side drive circuit 52 and is supplied via the data signal line SLn. In addition, a drain electrode of the transistor T1 is connected to an electrode on one side of the holding capacitor C1, a gate electrode of the transistor T4, and a source electrode of the transistor T2, and a source electrode of the transistor T1 is electrically connected to the initialization voltage line Vini to which the initialization voltage is supplied. A drain electrode of the transistor T2 is electrically connected to a drain electrode of the transistor T4 and a source electrode of the transistor T6, and the source electrode of the transistor T2 is electrically connected to the gate electrode of the transistor T4. A drain electrode of the transistor T3 is electrically connected to a source electrode of the transistor T4 and a drain electrode of the transistor T5. The gate electrode of the transistor T4 is electrically connected to an electrode on one side of the holding capacitor C1 and the source electrode of the transistor T2, the source electrode of the transistor T4 is electrically connected to the drain electrode of the transistor T3 and the drain electrode of the transistor T5, and the drain electrode of the transistor T4 is electrically connected to the drain electrode of the transistor T2 and the source electrode of the transistor T6. The source electrode of the transistor T5 is electrically connected to the branch wiring line VDEn of the first power supply voltage wiring lines VDM and VDE1 to VDEn to which the high-level power supply voltage ELVDD is supplied and an electrode on one side of the holding capacitor C1, and the drain electrode of the transistor T5 is electrically connected to the drain electrode of the transistor T3 and the source electrode of the transistor T4. The source electrode of the transistor T6 is electrically connected to the drain electrode of the transistor T4 and the drain electrode of the transistor T2, and the drain electrode of the transistor T6 is electrically connected to an anode electrode of the blue light-emitting element BLED. The source electrode of the transistor T7 is electrically connected to the initialization voltage line *Vini* to which an initialization voltage is supplied, and the drain electrode of the transistor T7 is electrically connected to the anode electrode of the blue light-emitting element BLED. An electrode on the other side of the holding capacitor C1 is electrically connected to the branch wiring line VDEn of the first power supply voltage wiring lines VDM and VDE1 to VDEn to which the high-level power supply voltage ELVDD is supplied. A cathode electrode of the blue light-emitting element BLED is electrically connected to the branch wiring line VSEn of the second power supply voltage wiring lines VSM, VSE1 to VSEn to which the low-level power supply voltage ELVSS is supplied.

In the blue subpixel drive circuit BSC' shown in (a) of FIG. 8, when the light emission control signal supplied via the light emission control line EMn changes from an L level to an H level, a P-type transistor T5 and a P-type transistor T6 change from an ON state to an OFF state and remain in an OFF state while the light emission control signal is at an H level. Thus, in a period in which the light emission control signal is at the H level, a current does not flow through the blue light-emitting element BLED, which is a non-light emission state. When a scanning signal supplied via the scanning signal line GLn changes from an H level to an L level during a period which is a non-light emission state (non-light emission period), a P-type transistor T7 is set to be in an ON state, and thus an initialization voltage is supplied, and the voltage of the anode electrode of the blue light-emitting element BLED is initialized. Further, in such a period which is a non-light emission state (non-light emission period), a scanning signal supplied to the gate electrode of the transistor T1 via the scanning signal line GLn-1 changes from an H level to an L level, whereby a P-type transistor T1 changes from an OFF state to an ON state and is maintained in an ON state while the scanning signal is at an L level. The period in which the transistor T1 is in an ON state is an initialization period, in which the holding capacitor C1 is initialized and the voltage of the gate electrode of the transistor T4 becomes an initialization voltage. After the scanning signal supplied via the scanning signal line GLn-1 changes to an H level, the scanning signal supplied via the scanning signal line GLn changes from an H level to an L level. Thereby, a P-type transistor T2 changes from an OFF state to an ON state and is maintained in an ON state while the scanning signal supplied via the scanning signal line GLn is at an L level, and the transistor T4 is set to be in a diode-connected state. A P-type transistor T3 changes from an OFF state to an ON state at the same timing as the above-described P-type transistor T2, and is maintained in an ON state while the scanning signal supplied via the scanning signal line GLn is at an L level. The period in which the transistor T3 is in an ON state is a data write period, and the voltage of the data signal supplied via the data signal line SLn is applied as a data voltage to the holding capacitor C1 via the diode-connected transistor T4. Thereby, the data voltage is written to and held in the holding capacitor C1, and the voltage of the gate electrode (gate voltage) of the transistor T4 is maintained at a voltage of an electrode on one side of the holding capacitor C1. After such a data write period, a scanning signal supplied via the scanning signal line GLn changes from an L level to an H level, and the transistor T2 and the transistor T3 are set to be in an OFF state. Thereafter, the light emission control signal supplied via the light emission control line EMn changes from an H level to an L level, the transistor T5 and the transistor T6 are set to be in an ON state, and a light emission period starts. In the adjustment circuit DSC' shown in (b) of FIG. 8, portions other than the non-light emitting diode DI which is the adjustment element of the adjustment circuit DSC' are the same as portions other than the light-emitting element (blue light-emitting element BLED) of the blue subpixel drive circuit BSC' shown in (a) of FIG. 8.

As described above, the display control circuit 55 shown in FIG. 1 generates the second write data based on a total value of gray scale values of the subpixels in the display region DA which is calculated from the input image signal (image data) IVD for one screen of the display region DA to be input, and the control circuit 53 controlling the adjustment circuit shown in FIG. 1 supplies the second write data to the adjustment circuit DSC' shown in (b) of FIG. 8 via the control signal lines CL1 to CLn as a control signal for controlling the adjustment circuit, thereby controlling the adjustment circuit DSC' shown in (b) of FIG. 8.

In the present embodiment, a case where the plurality of adjustment circuits DSC and DSC' are provided has been described as an example, but the disclosure is not limited thereto, and one or more adjustment circuits DSC and DSC' may be provided.

Second Embodiment

Next, a second embodiment of the disclosure will be described with reference to FIG. 9. A display device 1*a* in the present embodiment is different from that in the above-described first embodiment in that the width of a region 2 in which a plurality of adjustment circuits DSC are formed in a direction (right-left direction in FIG. 9) orthogonal to an extension direction (up-down direction in FIG. 9) of a trunk wiring line VDM of a first power supply voltage wiring line and a trunk wiring line VSM of a second power supply voltage wiring line increases as a distance from a starting point at which a high potential side power supply and a low potential side power supply are supplied increases. The other details are as described in the first embodiment. For convenience of description, members having the same functions as those shown in the drawings according to the first embodiment are denoted by the same reference numerals and signs, and descriptions thereof will be omitted.

FIG. 9 is a circuit diagram including first power supply voltage wiring lines VDM and VDE1 to VDEn, second power supply voltage wiring lines VSM and VSE1 to VSEn, subpixel circuits RSC, GSC, and BSC, and the adjustment circuits DSC, which are provided in the display device 1*a* according to the second embodiment.

As shown in FIG. 9, the width of the region 2 in which the plurality of adjustment circuits DSC are formed in a direction (right-left direction in FIG. 9) orthogonal to an extension direction (up-down direction in FIG. 9) of the trunk wiring line VDM of the first power supply voltage wiring line and the trunk wiring line VSM of the second power supply voltage wiring line increases as a distance from a starting point at which a high potential side power supply and a low potential side power supply are supplied increases.

In the region 2 in which the plurality of adjustment circuits DSC are formed, each of the trunk wiring line VDM of the first power supply voltage wiring lines VDM and VDE1 to VDEn and each of the trunk wiring line VSM of the second power supply voltage wiring lines VSM and VSE1 to VSEn is more likely to be affected by a voltage drop as a distance from a starting point at which a power supply voltage is supplied increases. In order to secure a sufficient amount of current in the region more likely to be affected by the voltage drop, it is necessary to increase the number of adjustment circuits DSC.

In the region 2 in which the plurality of adjustment circuits DSC provided in the display device 1*a* of the present embodiment are formed, the number of adjustment circuits DSC provided increases and the adjustment circuits DSC are formed wider as a distance from a starting point at which a high potential side power supply and a low potential side power supply are supplied in each of the trunk wiring line VDM of the first power supply voltage wiring lines VDM and VDE1 to VDEn and each of the trunk wiring line VSM of the second power supply voltage wiring lines VSM and VSE1 to VSEn increases. Thus, it is possible to secure a sufficient amount of current even in a region far from the starting point at which the high potential side power supply and the low potential side power supply are supplied in each of the trunk wiring line VDM of the first power supply voltage wiring lines VDM and VDE1 to VDEn and the trunk wiring line VSM of the second power supply voltage wiring lines VSM and VSE1 to VSEn which are likely to be affected by a voltage drop.

Further, in the display device 1*a* of the present embodiment, more red subpixel circuits RSC, green subpixel circuits GSC, and blue subpixel circuits BSC can be disposed in regions close to the starting point at which the high potential side power supply and the low potential side power supply are supplied in each of the trunk wiring line VDM of the first power supply voltage wiring lines VDM and VDE1 to VDEn and each of the trunk wiring line VSM of the second power supply voltage wiring lines VSM and VSE1 to VSEn, which are less affected by a voltage drop. Thus, it is possible to minimize a voltage drop of the light-emitting elements provided in each of the red subpixel circuits RSC, the green subpixel circuits GSC, and the blue subpixel circuits BSC.

In the present embodiment, as described above, a case where the number of adjustment circuits DSC is increased to secure a sufficient amount of current in a region that is more likely to be affected by a voltage drop has been described as an example, but the disclosure is not limited thereto. Although not shown in the drawing, for example, the number of adjustment circuits DSC disposed in each row in the region 2 in which the plurality of adjustment circuits DSC are formed may be the same regardless of a distance from the starting point at which the high potential side power supply and the low potential side power supply are supplied in each of the trunk wiring line VDM of the first power supply voltage wiring lines VDM and VDE1 to VDEn and each of the trunk wiring line VSM of the second power supply voltage wiring lines VSM and VSE1 to VSEn, and a resistance value of an adjustment element included in the adjustment circuit DSC disposed farther from the starting point at which the high potential side power supply and the low potential side power supply are supplied in each of the trunk wiring line VDM of the first power supply voltage wiring lines VDM and VDE1 to VDEn and each of the trunk wiring line VSM of the second power supply voltage wiring lines VSM and VSE1 to VSEn may be smaller than a resistance value of an adjustment element included in the adjustment circuit DSC disposed closer to the starting point. With such a configuration, it is possible to secure a sufficient amount of current even in a region far from the starting point at which the high potential side power supply and the low potential side power supply are supplied in each of the trunk wiring line VDM of the first power supply voltage wiring lines VDM and VDE1 to VDEn and the trunk wiring line VSM of the second power supply voltage wiring lines VSM and VSE1 to VSEn which are likely to be affected by a voltage drop.

Third Embodiment

Next, a third embodiment of the disclosure will be described with reference to FIG. 10. A display device 1*b* in the present embodiment is different from those in the above-described first and second embodiments in that an adjustment circuit DSC is provided between a first region in which trunk wiring line VDM of VDM and VDE1 to VDEn and trunk wiring line VSM of second power supply voltage wiring lines VSM and VSE1 to VSEn are formed and a second region in which a plurality of subpixel circuits RSC, GSC, and BSC are formed. The other details are as described in the first and second embodiments. For convenience of description, members having the same functions as those shown in the drawings according to the first and second embodiments are denoted by the same reference numerals and signs, and descriptions thereof will be omitted.

FIG. 10 is a circuit diagram including the first power supply voltage wiring lines VDM and VDE1 to VDEn, the second power supply voltage wiring lines VSM and VSE1 to VSEn, the subpixel circuits RSC, GSC, and BSC, and the adjustment circuits DSC, which are provided in the display device 1*b* according to the third embodiment.

As shown in FIG. 10, in the present embodiment, a first set of branch wiring lines that include the branch wiring line VDE1 of the first power supply voltage wiring line electrically connected to the trunk wiring line VDM of the first power supply voltage wiring line and the branch wiring line VSE1 of the second power supply voltage wiring line electrically connected to the trunk wiring line VSM of the second power supply voltage wiring line, a second set of branch wiring lines that include the branch wiring line VDE2 of the first power supply voltage wiring line electrically connected to the trunk wiring line VDM of the first power supply voltage wiring line and the branch wiring line VSE2 of the second power supply voltage wiring line electrically connected to the trunk wiring line VSM of the second power supply voltage wiring line, and an n-th set of branch wiring lines that include the branch wiring line VDEn of the first power supply voltage wiring line electrically connected to the trunk wiring line VDM of the first power supply voltage wiring line and the branch wiring line VSEn of the second power supply voltage wiring line electrically connected to the trunk wiring line VSM of the second power supply voltage wiring line are sequentially arranged in the direction of a starting point from a position farthest from the starting point at which a high potential side power supply and a low potential side power supply are supplied in each of the trunk wiring line VDM of the first power supply voltage wiring line and the trunk wiring line VSM of the second power supply voltage wiring line. In each of the n sets of branch wiring lines, each of the adjustment circuit DSC and the subpixel circuits (pixel circuits) RSC, GSC, and BSC is disposed between the branch wiring line of the first power supply voltage wiring line and the branch wiring line of the second power supply voltage wiring line and is connected to each of the branch wiring line of the first power supply voltage wiring line and the branch wiring line of the second power supply voltage wiring line. In each of the n sets of branch wiring lines, the adjustment circuit DSC is provided between a first region in which the trunk wiring line VDM of the first power supply voltage wiring line and the trunk wiring line VSM of the second power supply voltage wiring line are formed and a second region in which the plurality of subpixel circuits (pixel circuits) RSC, GSC, and BSC are formed.

As in the present embodiment, the second region in which the plurality of subpixel circuits RSC, GSC, and BSC are formed and which is farther from the first region in which the trunk wiring line VDM of the first power supply voltage wiring lines VDM and VDE1 to VDEn and the trunk wiring line VSM of the second power supply voltage wiring lines VSM and VSE1 to VSEn are formed is likely to be affected by a voltage drop. However, it is possible to minimize the influence of a voltage drop on the region 2 in which the plurality of adjustment circuits DSC are formed and which is closer to the first region in which the trunk wiring line VDM of the first power supply voltage wiring lines VDM and VDE1 to VDEn and the trunk wiring line VSM of the second power supply voltage wiring lines VSM and VSE1 to VSEn, and thus a larger amount of current tends to flow to the region 2 in which the plurality of adjustment circuits DSC are formed. Thus, it is possible to reduce the number of adjustment circuits DSC to be provided and to make the region 2 in which the plurality of adjustment circuits DSC are formed more compact.

Fourth Embodiment

Next, a fourth embodiment of the disclosure will be described with reference to FIG. 11. A display device 1$c$ in the present embodiment is different from that in the above-described third embodiment in that the width of a region 2 in which a plurality of adjustment circuits DSC are formed in a direction (right-left direction in FIG. 11) orthogonal to an extension direction (up-down direction in FIG. 11) of a trunk wiring line VDM of a first power supply voltage wiring line and a trunk wiring line VSM of a second power supply voltage wiring line increases as a distance from a starting point at which a high potential side power supply and a low potential side power supply are supplied increases. The other details are as described in the third embodiment. For convenience of description, members having the same functions as those shown in the drawings according to the third embodiment are denoted by the same reference numerals and signs, and descriptions thereof will be omitted.

FIG. 11 is a circuit diagram including first power supply voltage wiring lines VDM and VDE1 to VDEn, second power supply voltage wiring lines VSM and VSE1 to VSEn, subpixel circuits RSC, GSC, and BSC, and the adjustment circuits DSC, which are provided in the display device 1$c$ according to the fourth embodiment.

As shown in FIG. 11, the width of the region 2 in which the plurality of adjustment circuits DSC are formed in a direction (right-left direction in FIG. 11) orthogonal to an extension direction (up-down direction in FIG. 11) of the trunk wiring line VDM of the first power supply voltage wiring line and the trunk wiring line VSM of the second power supply voltage wiring line increases as a distance from a starting point at which a high potential side power supply and a low potential side power supply are supplied increases.

In the region 2 in which the plurality of adjustment circuits DSC are formed, each of the trunk wiring line VDM of the first power supply voltage wiring lines VDM and VDE1 to VDEn and each of the trunk wiring line VSM of the second power supply voltage wiring lines VSM and VSE1 to VSEn is more likely to be affected by a voltage drop as a distance from a starting point at which a high potential side power supply and a low potential side power supply are supplied increases. In order to secure a sufficient amount of current in the region more likely to be affected by the voltage drop, it is necessary to increase the number of adjustment circuits DSC.

In the region 2 in which the plurality of adjustment circuits DSC provided in the display device 1$c$ of the present embodiment are formed, the number of adjustment circuits DSC provided increases and the adjustment circuits DSC are formed wider as a distance from a starting point at which a high potential side power supply and a low potential side power supply are supplied in each of the trunk wiring line VDM of the first power supply voltage wiring lines VDM and VDE1 to VDEn and each of the trunk wiring line VSM of the second power supply voltage wiring lines VSM and VSE1 to VSEn increases. Thus, it is possible to secure a sufficient amount of current even in a region far from the starting point at which the high potential side power supply and the low potential side power supply are supplied in each of the trunk wiring line VDM of the first power supply voltage wiring lines VDM and VDE1 to VDEn and the trunk wiring line VSM of the second power supply voltage wiring lines VSM and VSE1 to VSEn which are likely to be affected by a voltage drop.

In the present embodiment, as described above, a case where the number of adjustment circuits DSC is increased to secure a sufficient amount of current in a region that is more likely to be affected by a voltage drop has been described as an example, but the disclosure is not limited thereto. Although not shown in the drawing, for example, the number of adjustment circuits DSC disposed in each row in the region 2 in which the plurality of adjustment circuits DSC are formed may be the same regardless of a distance from the starting point at which the high potential side power supply and the low potential side power supply are supplied in each of the trunk wiring line VDM of the first power supply voltage wiring lines VDM and VDE1 to VDEn and each of the trunk wiring line VSM of the second power supply voltage wiring lines VSM and VSE1 to VSEn, and a resistance value of an adjustment element included in the adjustment circuit DSC disposed farther from the starting point at which the high potential side power supply and the low potential side power supply are supplied in each of the trunk wiring line VDM of the first power supply voltage wiring lines VDM and VDE1 to VDEn and each of the trunk wiring line VSM of the second power supply voltage wiring lines VSM and VSE1 to VSEn may be smaller than a resistance value of an adjustment element included in the adjustment circuit DSC disposed closer to the starting point. With such a configuration, it is possible to secure a sufficient amount of current even in a region far from the starting point at which the high potential side power supply and the low potential side power supply are supplied in each of the trunk wiring line VDM of the first power supply voltage wiring lines VDM and VDE1 to VDEn and the trunk wiring line VSM of the second power supply voltage wiring lines VSM and VSE1 to VSEn which are likely to be affected by a voltage drop.

Fifth Embodiment

Next, a fifth embodiment of the disclosure will be described with reference to FIG. 12. A display device 1$d$ in the present embodiment is different from those in the above-described first to fourth embodiments in that an adjustment circuit DSC is connected to each of a branch wiring line VDE1 of first power supply voltage wiring lines VDM and VDE1 to VDEn and a branch wiring line VSE1 of second power supply voltage wiring lines VSM and VSE1 to VSEn which are electrically connected to positions farthest from a starting point at which a high potential side power supply and a low potential side power supply are supplied in each of a trunk wiring line VDM of the first power supply voltage wiring lines VDM and VDE1 to VDEn and a trunk wiring line VSM of the second power supply voltage wiring lines VSM and VSE1 to VSEn. The other details are as described in the first to fourth embodiments. For convenience of description, members having the same functions as those shown in the drawings according to the first to fourth embodiments are denoted by the same reference numerals and signs, and descriptions thereof will be omitted.

FIG. 12 is a circuit diagram including the first power supply voltage wiring lines VDM and VDE1 to VDEn, the second power supply voltage wiring lines VSM and VSE1 to VSEn, the subpixel circuits RSC, GSC, and BSC, and the adjustment circuits DSC, which are provided in the display device 1*d* according to the fifth embodiment.

As shown in FIG. 12, in the display device 1*d*, the adjustment circuit DSC is connected to each of the branch wiring line VDE1 of the first power supply voltage wiring lines VDM and VDE1 to VDEn and the branch wiring line VSE1 of the second power supply voltage wiring lines VSM and VSE1 to VSEn which are electrically connected to the positions farthest from a starting point at which a high potential side power supply and a low potential side power supply are supplied in each of the trunk wiring line VDM of the first power supply voltage wiring lines VDM and VDE1 to VDEn and the trunk wiring line VSM of the second power supply voltage wiring lines VSM and VSE1 to VSEn.

As in the present embodiment, the plurality of subpixel circuits RSC, GSC, and BSC are provided closer to the starting point at which the high potential side power supply and the low potential side power supply are supplied in each of the trunk wiring line VDM of the first power supply voltage wiring lines VDM, VDE1 to VDEn and the trunk wiring line VSM of the second power supply voltage wiring lines VSM, VSE1 to VSEn than a region 2 in which the adjustment circuits DSC are formed, and thus it is possible to reduce the influence of wiring line resistance in a light-emitting region (a region in which the subpixel circuits RSC, GSC, and BSC including light-emitting elements are provided) in a display region DA, and it is possible to minimize the influence of a voltage drop in the light-emitting region in the display region DA. On the other hand, the region 2 in which the adjustment circuits DSC are formed is disposed farther from a starting point at which a power supply voltage is supplied in each of the trunk wiring line VDM of the first power supply voltage wiring lines VDM and VDE1 to VDEn and the trunk wiring line VSM of the second power supply voltage wiring lines VSM and VSE1 to VSEn than the plurality of subpixel circuits RSC, GSC, and BSC, and thus the region 2 in which the adjustment circuits DSC are formed is more likely to be affected by a voltage drop. Thus, when it is necessary to secure a sufficient amount of current in the region 2 in which the adjustment circuits DSC are formed, the number of adjustment circuits DSC including the adjustment elements may be increased, a resistance value of the adjustment element included in the adjustment circuit DSC may be decreased without changing the number of adjustment circuits DSC including the adjustment elements, or the number of adjustment circuits DSC including the adjustment elements may be increased and the resistance value of the adjustment element included in the adjustment circuit DSC may be decreased.

In the present embodiment, a case where the plurality of adjustment circuits DSC are connected to each of the branch wiring line VDE1 of the first power supply voltage wiring lines VDM and VDE1 to VDEn and the branch wiring line VSE1 of the second power supply voltage wiring lines VSM and VSE1 to VSEn which are electrically connected to positions farthest from a starting point at which a power supply voltage is supplied in each of the trunk wiring line VDM of the first power supply voltage wiring lines VDM and VDE1 to VDEn and the trunk wiring line VSM of the second power supply voltage wiring lines VSM and VSE1 to VSEn has been described as an example, but the disclosure is not limited thereto. For example, in some sets of branch wiring lines among n sets of branch wiring lines, each of the plurality of adjustment circuits DSC may be disposed between the branch wiring line of the first power supply voltage wiring line and the branch wiring line of the second power supply voltage wiring line and connected to each of the branch wiring line of the first power supply voltage wiring line and the branch wiring line of the second power supply voltage wiring line. In some of the remaining sets of branch wiring lines among the n sets of branch wiring lines, each of the plurality of subpixel circuits (pixel circuits) RSC, GSC, and BSC may be disposed between the branch wiring line of the first power supply voltage wiring line and the branch wiring line of the second power supply voltage wiring line and connected to each of the branch wiring line of the first power supply voltage wiring line and the branch wiring line of the second power supply voltage wiring line. Some of the sets of branch wiring lines to which the plurality of adjustment circuits DSC are connected may be a set of branch wiring lines between a set of branch wiring lines disposed at a position farthest from a starting point at which a high potential side power supply and a low potential side power supply are supplied and a set of branch wiring lines disposed at an intermediate position in each of the trunk wiring line VDM of the first power supply voltage wiring lines and the trunk wiring line VSM of the second power supply voltage wiring lines. For example, some of the plurality of adjustment circuits DSC may be connected to the branch wiring line VDE1 of the first power supply voltage wiring lines VDM and VDE1 to VDEn and the branch wiring line VSE1 of the second power supply voltage wiring lines VSM and VSE1 to VSEn, which are sets of branch wiring lines disposed at the positions farthest from the starting point, and some of the remaining circuits of the plurality of adjustment circuits DSC may be connected to the branch wiring line VDE2 of the first power supply voltage wiring lines VDM and VDE1 to VDEn and the branch wiring line VSE2 of the second power supply voltage wiring lines VSM and VSE1 to VSEn, which are sets of branch wiring lines disposed at the positions second farthest from the starting point. The intermediate position means an intermediate position of each of the trunk wiring line VDM of the first power supply voltage wiring line and the trunk wiring line VSM of the second power supply voltage wiring line extending in the up-down direction in FIG. 12.

Sixth Embodiment

Next, a sixth embodiment of the disclosure will be described with reference to FIG. 13. A display device 1*e* in the present embodiment is different from those in the above-described first to fifth embodiments in that an adjustment circuit DSC is connected to each of a branch wiring line VDEn of first power supply voltage wiring lines VDM and VDE1 to VDEn and a branch wiring line VSEn of second power supply voltage wiring lines VSM and VSE1 to VSEn which are electrically connected to positions closest to a starting point at which a high potential side power supply and a low potential side power supply are supplied in each of a trunk wiring line VDM of the first power supply voltage wiring lines VDM and VDE1 to VDEn and a trunk wiring line VSM of the second power supply voltage wiring lines VSM and VSE1 to VSEn. The other details are as described in the first to fifth embodiments. For convenience of description, members having the same functions as those shown in the drawings according to the first to fifth embodiments are denoted by the same reference numerals and signs, and descriptions thereof will be omitted.

FIG. 13 is a circuit diagram including the first power supply voltage wiring lines VDM and VDE1 to VDEn, the second power supply voltage wiring lines VSM and VSE1 to VSEn, the subpixel circuits RSC, GSC, and BSC, and the adjustment circuits DSC, which are provided in the display device 1*e* according to the sixth embodiment.

As shown in FIG. 13, in the display device 1*e*, the adjustment circuit DSC is connected to each of the branch wiring line VDEn of the first power supply voltage wiring lines VDM and VDE1 to VDEn and the branch wiring line VSEn of the second power supply voltage wiring lines VSM and VSE1 to VSEn which are electrically connected to positions closest to a starting point at which a high potential side power supply and a low potential side power supply are supplied in each of the trunk wiring line VDM of the first power supply voltage wiring lines VDM and VDE1 to VDEn and the trunk wiring line VSM of the second power supply voltage wiring lines VSM and VSE1 to VSEn.

As shown in FIG. 13, a region 2 in which the adjustment circuits DSC are formed is provided closer to a starting point at which a high potential side power supply and a low potential side power supply are supplied in each of the trunk wiring line VDM of the first power supply voltage wiring lines VDM and VDE1 to VDEn and the trunk wiring line VSM of the second power supply voltage wiring lines VSM and VSE1 to VSEn than a region in which the plurality of subpixel circuits RSC, GSC, and BSC are formed. Thus, the region in which the plurality of subpixel circuits RSC, GSC, and BSC provided farther from a starting point at which a power supply voltage is supplied in each of the trunk wiring line VDM of the first power supply voltage wiring lines VDM and VDE1 to VDEn and the trunk wiring line VSM of the second power supply voltage wiring lines VSM and VSE1 to VSEn are formed is more likely to be affected by a voltage drop. However, it is possible to minimize the influence of a voltage drop on the region 2 in which the adjustment circuits DSC provided closer to a starting point at which a power supply voltage is supplied in each of the trunk wiring line VDM of the first power supply voltage wiring lines VDM and VDE1 to VDEn and the trunk wiring line VSM of the second power supply voltage wiring lines VSM and VSE1 to VSEn are formed, and thus a larger amount of current tends to flow to the region 2 in which the adjustment circuits DSC are formed. Thus, it is possible to reduce the number of adjustment circuits DSC to be provided and to make the region 2 in which the plurality of adjustment circuits DSC are formed more compact.

In the present embodiment, a case where the plurality of adjustment circuits DSC are connected to the branch wiring line VDEn of the first power supply voltage wiring lines VDM and VDE1 to VDEn and the branch wiring line VSEn of the second power supply voltage wiring lines VSM and VSE1 to VSEn, which are electrically connected to positions closest to a starting point at which a high potential side power supply and a low potential side power supply are supplied in each of the trunk wiring line VDM of the first power supply voltage wiring lines VDM and VDE1 to VDEn and the trunk wiring line VSM of the second power supply voltage wiring lines VSM and VSE1 to VSEn has been described as an example, but the disclosure is not limited thereto. For example, in some sets of branch wiring lines among n sets of branch wiring lines, each of the plurality of adjustment circuits DSC may be disposed between the branch wiring line of the first power supply voltage wiring line and the branch wiring line of the second power supply voltage wiring line and connected to each of the branch wiring line of the first power supply voltage wiring line and the branch wiring line of the second power supply voltage wiring line. In some of the remaining sets of branch wiring lines among the n sets of branch wiring lines, each of the plurality of subpixel circuits (pixel circuits) RSC, GSC, and BSC may be disposed between the branch wiring line of the first power supply voltage wiring line and the branch wiring line of the second power supply voltage wiring line and connected to each of the branch wiring line of the first power supply voltage wiring line and the branch wiring line of the second power supply voltage wiring line. Some of the sets of branch wiring lines to which the plurality of adjustment circuits DSC are connected may be a set of branch wiring lines between a set of branch wiring lines disposed at a position closest to a starting point at which a high potential side power supply and a low potential side power supply are supplied and a set of branch wiring lines disposed at an intermediate position in each of the trunk wiring line VDM of the first power supply voltage wiring lines and the trunk wiring line VSM of the second power supply voltage wiring lines. For example, some of the plurality of adjustment circuits DSC may be connected to the branch wiring line VDEn of the first power supply voltage wiring lines VDM and VDE1 to VDEn and the branch wiring line VSEn of the second power supply voltage wiring lines VSM and VSE1 to VSEn, which are sets of branch wiring lines disposed at the positions closest to the starting point, and some of the remaining circuits of the plurality of adjustment circuits DSC may be connected to the branch wiring line VDEn-1 of the first power supply voltage wiring lines VDM and VDE1 to VDEn and the branch wiring line VSEn-1 of the second power supply voltage wiring lines VSM and VSE1 to VSEn, which are sets of branch wiring lines disposed at the positions second closest to the starting point. The intermediate position means an intermediate position of each of the trunk wiring line VDM of the first power supply voltage wiring line and the trunk wiring line VSM of the second power supply voltage wiring line extending in the up-down direction in FIG. 13.

Seventh Embodiment

Next, a seventh embodiment of the disclosure will be described with reference to FIG. 14. A display device If in the present embodiment is different from those in the above-described first to sixth embodiments in that a region in which a plurality of subpixel circuits RSC, GSC, and BSC are formed is divided into two or more regions, and a region in which adjustment circuits DSC are formed is interposed between the two or more separate regions in which the plurality of subpixel circuits RSC, GSC, and BSC are formed. The other details are as described in the first to sixth embodiments. For convenience of description, members having the same functions as those shown in the drawings according to the first to sixth embodiments are denoted by the same reference numerals and signs, and descriptions thereof will be omitted.

FIG. 14 is a circuit diagram showing the first power supply voltage wiring lines VDM and VDE1 to VDEn, the second power supply voltage wiring lines VSM and VSE1 to VSEn, the subpixel circuits RSC, GSC, and BSC, and the adjustment circuits DSC, which are provided in the display device If according to the seventh embodiment.

As shown in FIG. 14, the region in which the plurality of subpixel circuits RSC, GSC, and BSC are formed is divided into two or more regions, and the region in which the adjustment circuits DSC are formed is interposed between the two or more separate regions in which the plurality of subpixel circuits RSC, GSC, and BSC are formed. In other words, the region in which the plurality of subpixel circuits RSC, GSC, and BSC are formed is divided into two or more regions, a region 2 in which the adjustment circuits DSC are formed is divided into a region 2*a* in which the adjustment circuit DSC is formed, a region 2*b* in which the adjustment circuit DSC is formed, and a region 2*c* in which the adjustment circuit DSC is formed, and each of the region 2*a* in which the adjustment circuit DSC is formed, the region 2*b* in which the adjustment circuit DSC is formed, and the region 2*c* in which the adjustment circuit DSC is formed is interposed between the two or more separate regions in which the plurality of subpixel circuits RSC, GSC, and BSC are formed.

According to the display device If shown in FIG. 14, among the region 2*a* in which the adjustment circuit DSC is formed, the region 2*b* in which the adjustment circuit DSC is formed, and the region 2*c* in which the adjustment circuit DSC is formed, it is possible to suppress the influence of a voltage drop on the region 2*a* in which the adjustment circuit DSC is formed and which is provided near a first region in which the trunk wiring line VDM of the first power supply voltage wiring lines VDM and VDE1 to VDEn and the trunk wiring line VSM of the second power supply voltage wiring lines VSM and VSE1 to VSEn are formed, and the region 2*c* in which the adjustment circuit DSC is formed and which is provided farther from the first region in which the trunk wiring line VDM of the first power supply voltage wiring lines VDM and VDE1 to VDEn and the trunk wiring line VSM of the second power supply voltage wiring lines VSM and VSE1 to VSEn are formed is likely to be affected by a voltage drop. Thus, in the display device 1*f*, when it is necessary to secure a sufficient amount of current, the region 2*a* in which the adjustment circuits DSC are formed and which is less affected by a voltage drop can be preferentially used, and when it is necessary to secure a small amount of current, the region 2*c* in which the adjustment circuits DSC are formed and which is likely to be affected by a voltage drop can be preferentially used.

In the display device If of the present embodiment, a case where each of the region in which the adjustment circuits DSC are formed and the two or more separate regions in which the plurality of subpixel circuits RSC, GSC, and BSC are formed is formed in a stripe shape has been described as an example, but the disclosure is not limited thereto. For example, a configuration may be adopted in which, in each of n sets of branch wiring lines, each of the adjustment circuit DSC and the subpixel circuits (pixel circuits) RSC, GSC, and BSC is disposed between the branch wiring line of the first power supply voltage wiring line and the branch wiring line of the second power supply voltage wiring line and is connected to the branch wiring line of the first power supply voltage wiring line and the branch wiring line of the second power supply voltage wiring line, and each of the n sets of branch wiring lines includes a portion in which the adjustment circuits DSC and the subpixel circuits (pixel circuits) RSC, GSC, and BSC are alternately provided. In this manner, a configuration including a portion in which the adjustment circuits DSC and the subpixel circuits RSC, GSC, and BSC are alternately provided is adopted, and thus the adjustment circuits DSC are not concentrated on a specific portion, and even when the adjustment circuit DSC is present in a display region DA, luminance unevenness is hardly recognized.

Eighth Embodiment

Next, an eighth embodiment of the disclosure will be described with reference to FIG. 15. A display device 1*g* in the present embodiment is different from that in the above-described first embodiment in that a plurality of subpixel circuits RSC, GSC, and BSC are provided in a display region DA and adjustment circuits DSC are provided in a frame region NDA. The other details are as described in the first embodiment. For convenience of description, members having the same functions as those shown in the drawings according to the first embodiment are denoted by the same reference numerals and signs, and descriptions thereof will be omitted.

FIG. 15 is a circuit diagram including first power supply voltage wiring lines VDM and VDE1 to VDEn, second power supply voltage wiring lines VSM and VSE1 to VSEn, the subpixel circuits RSC, GSC, and BSC, and the adjustment circuits DSC, which are provided in the display device 1*g* according to the eighth embodiment.

In the first embodiment described above, a case where the plurality of subpixel circuits RSC, GSC, and BSC and the adjustment circuits DSC are provided in the display region DA as in the display device 1 shown in FIG. 2 has been described, but in the display device 1*g* shown in FIG. 15 of the present embodiment, the plurality of subpixel circuits RSC, GSC, and BSC are provided in the display region DA, and the adjustment circuits DSC are provided in the frame region NDA. According to the display device 1*g*, the adjustment circuits DSC which are non-light emitting regions are not provided in the display region DA, and thus it is possible to maximally utilize the display region DA.

In the case of the display device 1 shown in FIG. 2 according to the first embodiment, the plurality of adjustment circuits DSC are provided in the display region DA, and thus the subpixel circuits RSC, GSC, and BSC and the adjustment circuits DSC provided in the display region DA can be formed in the same manufacturing process using the same mask, thereby making it possible to reduce the number of manufacturing steps. On the other hand, in the case of the display device 1*g* shown in FIG. 15 of the present embodiment, the plurality of adjustment circuits DSC are provided in the frame region NDA, and thus the subpixel circuits RSC, GSC, and BSC provided in the display region DA and the adjustment circuits DSC provided in the frame region NDA can be formed in different manufacturing processes using different masks, whereby it is relatively easy to form the material constituting the subpixel circuits RSC, GSC, and BSC and the material constituting the adjustment circuits DSC with different materials. In addition, the adjustment circuits DSC are provided in the frame region NDA which is a non-light emitting region, and thus, even when the number of adjustment circuits DSC provided in the frame region NDA is increased, it is possible to minimize the influence on the appearance of the display region DA.

Ninth Embodiment

Next, a ninth embodiment of the disclosure will be described with reference to FIG. 16. A display device 1*h* in the present embodiment is different from that in the above-described fifth embodiment in that a plurality of subpixel circuits RSC, GSC, and BSC are provided in a display region DA and adjustment circuits DSC are provided in a frame region NDA. The other details are as described in the fifth embodiment. For convenience of description, members having the same functions as those shown in the drawings according to the fifth embodiment are denoted by the same reference numerals and signs, and descriptions thereof will be omitted.

FIG. 16 is a circuit diagram including first power supply voltage wiring lines VDM and VDE1 to VDEn, second power supply voltage wiring lines VSM and VSE1 to VSEn, the subpixel circuits RSC, GSC, and BSC, and the adjustment circuits DSC, which are provided in the display device 1*h* according to the ninth embodiment.

In the fifth embodiment described above, a case where the plurality of subpixel circuits RSC, GSC, and BSC and the adjustment circuits DSC are provided in the display region DA as in the display device 1*d* shown in FIG. 12 has been described, but in the display device 1*h* shown in FIG. 16 of the present embodiment, the plurality of subpixel circuits RSC, GSC, and BSC are provided in a display region DA, and the adjustment circuits DSC are provided in a frame region NDA. According to the display device 1*h*, the adjustment circuits DSC which are non-light emitting regions are not provided in the display region DA, and thus it is possible to maximally utilize the display region DA.

In the case of the display device 1*d* shown in FIG. 12 according to the fifth embodiment, the plurality of adjustment circuits DSC are provided in the display region DA, and thus the subpixel circuits RSC, GSC, and BSC and the adjustment circuits DSC provided in the display region DA can be formed in the same manufacturing process using the same mask, thereby making it possible to reduce the number of manufacturing steps. On the other hand, in the case of the display device 1*h* shown in FIG. 16 of the present embodiment, the plurality of adjustment circuits DSC are provided in the frame region NDA, and thus the subpixel circuits RSC, GSC, and BSC provided in the display region DA and the adjustment circuits DSC provided in the frame region NDA can be formed in different manufacturing processes using different masks, whereby it is relatively easy to form the material constituting the subpixel circuits RSC, GSC, and BSC and the material constituting the adjustment circuits DSC with different materials.

Tenth Embodiment

Next, a tenth embodiment of the disclosure will be described with reference to FIG. 17. A display device 1*i* of the present embodiment is different from those in the above-described first to ninth embodiments in that a plurality of subpixel circuits RSC, GSC, and BSC are provided in a display region DA, adjustment circuits DSC are provided in a frame region NDA, and three sides of a region in which the plurality of subpixel circuits RSC, GSC, and BSC are formed are surrounded by a trunk wiring line VDM of first power supply voltage wiring lines VDM and VDE1 to VDEn, a trunk wiring line VSM of second power supply voltage wiring lines VSM and VSE1 to VSEn, and a region in which the adjustment circuits DSC are formed. The other details are as described in the first to ninth embodiments. For convenience of description, members having the same functions as those shown in the drawings according to the first to ninth embodiments are denoted by the same reference numerals and signs, and descriptions thereof will be omitted.

FIG. 17 is a circuit diagram including the first power supply voltage wiring lines VDM and VDE1 to VDEn, the second power supply voltage wiring lines VSM and VSE1 to VSEn, the subpixel circuits RSC, GSC, and BSC, and the adjustment circuits DSC, which are provided in the display device 1*i* according to the tenth embodiment.

As shown in FIG. 17, the plurality of subpixel circuits RSC, GSC, and BSC are provided in the display region DA, and the adjustment circuits DSC are provided in the frame region NDA. The three sides of the region in which the plurality of subpixel circuits RSC, GSC, and BSC are formed are surrounded by the trunk wiring line VDM of the first power supply voltage wiring lines VDM and VDE1 to VDEn, the trunk wiring line VSM of the second power supply voltage wiring lines VSM and VSE1 to VSEn, and the region in which the adjustment circuits DSC are formed. In the case of the display device 1*i* shown in FIG. 17 according to the present embodiment, the plurality of adjustment circuits DSC are provided in the frame region NDA, and thus the display device 1*i* can be formed in a relatively free shape and a relatively free size as compared with a case where the plurality of adjustment circuits DSC are provided in the display region DA.

As shown in FIG. 17, in the display device 1*i*, in a first set of branch wiring lines including the branch wiring line VDE1 of the first power supply voltage wiring line electrically connected to the trunk wiring line VDM of the first power supply voltage wiring line and the branch wiring line VSE1 of the second power supply voltage wiring line electrically connected to the trunk wiring line VSM of the second power supply voltage wiring line, which is a portion of n sets of branch wiring lines, each of the plurality of adjustment circuits DSC is disposed between the branch wiring line of the first power supply voltage wiring line and the branch wiring line of the second power supply voltage wiring line and is connected to each of the branch wiring line of the first power supply voltage wiring line and the branch wiring line of the second power supply voltage wiring line. In a second set of branch wiring lines including the branch wiring line VDE2 of the first power supply voltage wiring line electrically connected to the trunk wiring line VDM of the first power supply voltage wiring line and the branch wiring line VSE2 of the second power supply voltage wiring line electrically connected to the trunk wiring line VSM of the second power supply voltage wiring line, which is a portion of the remaining sets of branch wiring lines among the n sets of branch wiring lines, a third set of branch wiring lines including the branch wiring line VDE3 of the first power supply voltage wiring line electrically connected to the trunk wiring line VDM of the first power supply voltage wiring line (not shown) and the branch wiring line VSE3 of the second power supply voltage wiring line electrically connected to the trunk wiring line VSM of the second power supply voltage wiring line to an n−1-th set of branch wiring lines including the branch wiring line VDEn-1 of the first power supply voltage wiring line electrically connected to the trunk wiring line VDM of the first power supply voltage wiring line and the branch wiring line VSEn-1 of the second power supply voltage wiring line electrically connected to the trunk wiring line VSM of the second power supply voltage wiring line, and an n-th set of branch wiring lines including the branch wiring line VDEn of the first power supply voltage wiring line electrically connected to the trunk wiring line VDM of the first power supply voltage wiring line and the branch wiring line VSEn of the second power supply voltage wiring line electrically connected to the trunk wiring line VSM of the second power supply voltage wiring line, each of the adjustment circuits DSC and the subpixel circuits (pixel circuits) RSC, GSC, and BSC is disposed between the branch wiring line of the first power supply voltage wiring line and the branch wiring line of the second power supply voltage wiring line and is connected to each of the branch wiring line of the first power supply voltage wiring line and the branch wiring line of the second power supply voltage wiring line.

Eleventh Embodiment

Next, an eleventh embodiment of the disclosure will be described with reference to FIG. 18. A display device 1*j* in the present embodiment is different from that in the above-described tenth embodiment in that a plurality of subpixel circuits RSC, GSC, and BSC are provided in a display region DA, adjustment circuits DSC are provided in a frame region NDA, and four sides of a region in which the plurality of subpixel circuits RSC, GSC, and BSC are formed are surrounded by a trunk wiring line VDM of first power supply voltage wiring lines VDM and VDE1 to VDEn, a trunk wiring line VSM of second power supply voltage wiring lines VSM and VSE1 to VSEn, and a region in which the adjustment circuits DSC are formed. The other details are as described in the tenth embodiment. For convenience of description, members having the same functions as those shown in the drawings according to the tenth embodiment are denoted by the same reference numerals and signs, and descriptions thereof will be omitted.

FIG. 18 is a circuit diagram including the first power supply voltage wiring lines VDM and VDE1 to VDEn, the second power supply voltage wiring lines VSM and VSE1 to VSEn, the subpixel circuits RSC, GSC, and BSC, and the adjustment circuits DSC, which are provided in the display device 1*j* according to the eleventh embodiment.

As shown in FIG. 18, the plurality of subpixel circuits RSC, GSC, and BSC are provided in the display region DA, and the adjustment circuits DSC are provided in the frame region NDA. The four sides of the region in which the plurality of subpixel circuits RSC, GSC, and BSC are formed are surrounded by the trunk wiring line VDM of the first power supply voltage wiring lines VDM and VDE1 to VDEn, the trunk wiring line VSM of the second power supply voltage wiring lines VSM and VSE1 to VSEn, and the region in which the adjustment circuits DSC are formed. In the case of the display device 1*j* shown in FIG. 17 according to the present embodiment, the plurality of adjustment circuits DSC are provided in the frame region NDA, and thus the display device 1*i* can be formed in a relatively free shape and a relatively free size as compared with a case where the plurality of adjustment circuits DSC are provided in the display region DA.

As shown in FIG. 18, in the display device 1*j*, in a first set of branch wiring lines including the branch wiring line VDE1 of the first power supply voltage wiring line electrically connected to the trunk wiring line VDM of the first power supply voltage wiring line and the branch wiring line VSE1 of the second power supply voltage wiring line electrically connected to the trunk wiring line VSM of the second power supply voltage wiring line, which is a portion of n sets of branch wiring lines, and an n-th set of branch wiring lines including the branch wiring line VDEn of the first power supply voltage wiring line electrically connected to the trunk wiring line VDM of the first power supply voltage wiring line and the branch wiring line VSEn of the second power supply voltage wiring line electrically connected to the trunk wiring line VSM of the second power supply voltage wiring line, each of the plurality of adjustment circuits DSC is disposed between the branch wiring line of the first power supply voltage wiring line and the branch wiring line of the second power supply voltage wiring line and is connected to each of the branch wiring line of the first power supply voltage wiring line and the branch wiring line of the second power supply voltage wiring line. In a second set of branch wiring lines including the branch wiring line VDE2 of the first power supply voltage wiring line electrically connected to the trunk wiring line VDM of the first power supply voltage wiring line and the branch wiring line VSE2 of the second power supply voltage wiring line electrically connected to the trunk wiring line VSM of the second power supply voltage wiring line, which is a portion of the remaining sets of branch wiring lines among the n sets of branch wiring lines, each of the adjustment circuits DSC and the subpixel circuits (pixel circuits) RSC, GSC, and BSC is disposed between the branch wiring line of the first power supply voltage wiring line and the branch wiring line of the second power supply voltage wiring line and is connected to each of the branch wiring line of the first power supply voltage wiring line and the branch wiring line of the second power supply voltage wiring line.

Twelfth Embodiment

Next, a twelfth embodiment of the disclosure will be described with reference to FIG. 19. A display device 1*k* in the present embodiment is different from those in the above-described third and fourth embodiments in that the width of a region 2 in which a plurality of adjustment circuits DSC are formed in a direction (right-left direction in FIG. 19) orthogonal to an extension direction (up-down direction in FIG. 19) of a trunk wiring line VDM of a first power supply voltage wiring line and a trunk wiring line VSM of a second power supply voltage wiring line decreases as a distance from a starting point at which a high potential side power supply and a low potential side power supply are supplied increases. The other details are as described in the third and fourth embodiments. For convenience of description, members having the same functions as those shown in the drawings according to the third and fourth embodiments are denoted by the same reference numerals and signs, and descriptions thereof will be omitted.

FIG. 19 is a circuit diagram including first power supply voltage wiring lines VDM and VDE1 to VDEn, second power supply voltage wiring lines VSM and VSE1 to VSEn, subpixel circuits RSC, GSC, and BSC, and adjustment circuits DSC, which are provided in the display device 1*k* according to the twelfth embodiment.

As shown in FIG. 19, the width of the region 2 in which the plurality of adjustment circuits DSC are formed in a direction (right-left direction in FIG. 19) orthogonal to an extension direction (up-down direction in FIG. 19) of the trunk wiring line VDM of the first power supply voltage wiring line and the trunk wiring line VSM of the second power supply voltage wiring line decreases as a distance from a starting point at which a high potential side power supply and a low potential side power supply are supplied increases.

In the present embodiment, the region 2 in which the plurality of adjustment circuits DSC are formed is more likely to be affected by a voltage drop as a distance from a starting point at which a high potential side power supply and a low potential side power supply are supplied in each of the trunk wiring line VDM of the first power supply voltage wiring lines VDM and VDE1 to VDEn and the trunk wiring line VSM of the second power supply voltage wiring lines VSM and VSE1 to VSEn increases, and thus the number of adjustment circuits DSC is reduced in a region that is more likely to be affected by a voltage drop. As in the case of the display device 1*b* (see FIG. 10) according to the third embodiment described above, according to the display device 1*k* of the present embodiment, a larger amount of current is likely to flow to the region 2 in which the plurality of adjustment circuits DSC are formed. Thus, it is possible to reduce the number of adjustment circuits DSC to be provided and to make the region 2 in which the plurality of adjustment circuits DSC are formed more compact.

Thirteenth Embodiment

Next, a thirteenth embodiment of the disclosure will be described with reference to FIG. 20 and FIG. 21. A display device 11 in the present embodiment is different from those in the above-described first to twelfth embodiments in that adjustment elements included in an adjustment circuit are charging elements. The other details are as described in the first to twelfth embodiments. For convenience of description, members having the same functions as those shown in the drawings according to the first to twelfth embodiments are denoted by the same reference numerals and signs, and descriptions thereof will be omitted.

FIG. 20 is a circuit diagram showing first power supply voltage wiring lines VDM and VDE1 to VDEn, second power supply voltage wiring lines VSM and VSE1 to VSEn, subpixel circuits RSC, GSC, and BSC, and an adjustment circuit including charging elements RCC and switching elements SW1 to SWn and SW1' to SWn', which are provided in the display device 11 according to the thirteenth embodiment, and shows a case where the charging elements RCC are charged.

FIG. 21 is a circuit diagram showing the first power supply voltage wiring lines VDM and VDE1 to VDEn, the second power supply voltage wiring lines VSM and VSE1 to VSEn, the subpixel circuits RSC, GSC, and BSC, and the adjustment circuits including the charging elements RCC and the switching elements SW1 to SWn and SW1' to SWn', which are provided in the display device 11 according to the thirteenth embodiment, and shows a case where the charging elements RCC are discharged.

As shown in FIG. 20 and FIG. 21, a region 2' in which a plurality of adjustment circuits are formed is provided in a frame region NDA of the display device 1*k*. Each of the plurality of adjustment circuits includes the charging element RCC which is an adjustment element, the switching elements SW1 to SWn, and the switching elements SW1' to SWn'.

As shown in FIG. 20, the control circuit 53 controlling the adjustment circuit shown in FIG. 1 performs control so that the switching elements SW1 to SWn connected to the branch wiring lines VDE1 to VDEn of the first power supply voltage wiring lines VDM and VDE1 to VDEn and the switching elements SW1' to SWn' connected to the branch wiring lines VSE1 to VSEn of the second power supply voltage wiring lines VSM and VSE1 to VSEn are set to be in an ON state so that the charging element RCC is electrically connected to each of the first power supply voltage wiring lines VDM and VDE1 to VDEn and the second power supply voltage wiring lines VSM and VSE1 to VSEn and the charging element RCC is charged during a display period in which display is performed in a display region DA. At this time, a switching element SWa and a switching element SWa' that connect a charging target device 60 and the plurality of adjustment circuits are set to be in an OFF state. The number of switching elements to be turned on among the switching elements SW1 to SWn and the switching elements SW1' to SWn' can be determined, for example, from a total value of gray scale values of subpixels in the display region DA which is calculated by a display control circuit 55 from an input image signal (image data) IVD for one screen of the display region DA to be input, as in the case of the above-described embodiments. FIG. 20 shows a case where all of the switching elements are turned on. As shown in FIG. 21, the control circuit 53 controlling the adjustment circuit shown in FIG. 1 performs control so that the switching elements SW1 to SWn and the switching elements SW1' to SWn' are set to be in an OFF state so that the charging element RCC is electrically disconnected from each of the first power supply voltage wiring lines VDM and VDE1 to VDEn and the second power supply voltage wiring lines VSM and VSE1 to VSEn and the charging element RCC is discharged during a non-display period in which display is not performed in the display region DA after the display period. At this time, the switching element SWa and the switching element SWa' that connect the charging target device 60 and the plurality of adjustment circuits are set to be in an ON state. Thus, the charging target device 60 is charged by the charging element RCC during the non-display period in which display is not performed in the display region DA after the display period.

In the present embodiment, a case where the charging element RCC is a capacitor is described as an example, but the disclosure is not limited thereto, and the charging element RCC may be a secondary battery.

According to the display device 11 of the present embodiment, when one or more light-emitting elements are caused to emit light based on the same gray scale value without causing an unnecessary increase in resistance of the first power supply voltage wiring line and the second power supply voltage wiring line or a decrease in yield, it is possible to realize a display device in which occurrence of a large difference in the actual light emission luminance of each light-emitting element between the case of a high lighting rate and the case of a low lighting rate is suppressed and to realize power saving.

Appendix

The disclosure is not limited to the embodiments described above, and various modifications may be made within the scope of the claims. Embodiments obtained by appropriately combining technical approaches disclosed in the different embodiments also fall within the technical scope of the disclosure. Furthermore, novel technical features can be formed by combining the technical approaches disclosed in each of the embodiments.

INDUSTRIAL APPLICABILITY

The disclosure can be utilized for a display device.

The invention claimed is:

1. A display device comprising:

a plurality of subpixels that includes pixel circuits including, respectively, light-emitting elements;

a display region that includes the plurality of subpixels;

a frame region that is provided outside the display region;

a first power supply voltage wiring line for supplying a high potential side power supply to the pixel circuits;

a second power supply voltage wiring line for supplying a low potential side power supply to the pixel circuits;

one or more adjustment circuits, each of which includes a switching element and an adjustment element and is connected to the first power supply voltage wiring line and the second power supply voltage wiring line; and a control circuit that controls a current value of the adjustment element based on image data, wherein the pixel circuits or the one or more adjustment circuits are provided between a first region in which a trunk wiring line of the first power supply voltage wiring line and a trunk wiring line of the second power supply voltage wiring line are formed and a second region in which the one or more adjustment circuits or the pixel circuits are formed.

2. The display device according to claim 1, wherein the pixel circuits and the one or more adjustment circuits are connected in parallel to the first power supply voltage wiring line and the second power supply voltage wiring line, respectively.

3. The display device according to claim 1, further comprising:
a display control circuit;
a data-side drive circuit that includes the control circuit;
a plurality of data signal lines; and
one or more control signal lines,
wherein the display control circuit generates first write data for controlling each of the plurality of subpixels and second write data for controlling the one or more adjustment circuits based on the image data, and
the data-side drive circuit outputs the first write data, supplied from the display control circuit, as a data signal via the plurality of data signal lines, and outputs the second write data, supplied from the display control circuit, as a control signal for controlling the one or more adjustment circuits via the one or more control signal lines.

4. The display device according to claim 1, further comprising:
a display control circuit;
a data-side drive circuit;
a plurality of data signal lines; and
one or more control signal lines,
wherein the display control circuit generates first write data for controlling each of the plurality of subpixels and second write data for controlling the one or more adjustment circuits based on the image data,
the data-side drive circuit outputs the first write data, supplied from the display control circuit, as a data signal via the plurality of data signal lines, and
the control circuit outputs the second write data, supplied from the display control circuit, as a control signal for controlling the one or more adjustment circuits via the one or more control signal lines.

5. The display device according to claim 1, further comprising:
a display control circuit;
a data-side drive circuit;
a plurality of data signal lines; and
one or more control signal lines,
wherein the display control circuit generates first write data for controlling each of the plurality of subpixels based on the image data,
the data-side drive circuit outputs the first write data, supplied from the display control circuit, as a data signal via the plurality of data signal lines, and
the control circuit generates second write data for controlling the one or more adjustment circuits based on the image data, and outputs the second write data as a control signal for controlling the one or more adjustment circuits via the one or more control signal lines.

6. The display device according to claim 1,
wherein the image data includes first image data and second image data,
an amount of current flowing through the first power supply voltage wiring line and the second power supply voltage wiring line in a first case that display is performed in the display region based on the first image data is smaller than an amount of current flowing through the first power supply voltage wiring line and the second power supply voltage wiring line in a second case that display is performed in the display region based on the second image data, and
a value of a current flowing through the adjustment element in the first case is larger than a value of a current flowing through the adjustment element in the second case.

7. The display device according to claim 6,
wherein a plurality of adjustment circuits, including the one or more adjustment circuits, is provided, and
a sum of values of currents flowing through the adjustment elements provided in the plurality of adjustment circuits is larger in the first case than in the second case.

8. The display device according to claim 1,
wherein the adjustment element is a non-light emitting diode.

9. The display device according to claim 1,
wherein the adjustment element is a charging element.

10. The display device according to claim 9,
wherein the image data includes first image data and second image data,
an amount of current flowing through the first power supply voltage wiring line and the second power supply voltage wiring line in a first case that display is performed in the display region based on the first image data is smaller than an amount of current flowing through the first power supply voltage wiring line and the second power supply voltage wiring line in a second case that display is performed in the display region based on the second image data,
the control circuit controls the switching element such that the charging element is electrically connected to each of the first power supply voltage wiring line and the second power supply voltage wiring line and the charging element is charged during a display period in which display is performed in the display region,
a sum of values of currents flowing through the charging element is larger in the first case than in the second case, and
the control circuit further controls the switching element such that the charging element is electrically disconnected from each of the first power supply voltage wiring line and the second power supply voltage wiring line and the charging element is discharged during a non-display period in which display is not performed in the display region after the display period.

11. The display device according to claim 9,
wherein the charging element is a capacitor.

12. The display device according to claim 9,
wherein the charging element is a secondary battery.

13. The display device according to claim 1,
wherein n sets of branch wiring line, including (i) a branch wiring line of the first power supply voltage wiring line electrically connected to the trunk wiring line of the first power supply voltage wiring line and (ii) a branch wiring line of the second power supply voltage wiring line electrically connected to the trunk wiring line of the second power supply voltage wiring line, are sequentially arranged, in a direction from a position farthest from a starting point to the starting point at which the high potential side power supply and the low potential side power supply are supplied, in each of the trunk wiring line of the first power supply voltage wiring line and the trunk wiring line of the second power supply voltage wiring line, where n is a natural number equal to 2 or greater, a plurality of adjustment circuits, including the one or more adjustment circuits, is provided, each of the plurality of adjustment circuits is disposed between the branch wiring line of the first power supply voltage wiring line and the branch wiring line of the second power supply voltage wiring line, and is connected to each of the branch wiring line of the first power supply voltage wiring line and the branch wiring line of the second power supply voltage wiring line in a first portion of the n sets of branch wiring lines, and each of the pixel circuits is disposed between the branch wiring line of the first power supply voltage wiring line and the branch wiring line of the second power supply voltage wiring line, and is connected to each of the branch wiring line of the first power supply voltage wiring line and the branch wiring line of the second power supply voltage wiring line in a second portion of the n sets of branch wiring lines.

14. The display device according to claim 1, wherein n sets of branch wiring line, including (i) a branch wiring line of the first power supply voltage wiring line electrically connected to the trunk wiring line of the first power supply voltage wiring line and a branch wiring line of the second power supply voltage wiring line electrically connected to the trunk wiring line of the second power supply voltage wiring line, are sequentially arranged, in a direction from a position farthest from a starting point to the starting point at which the high potential side power supply and the low potential side power supply are supplied, in each of the trunk wiring line of the first power supply voltage wiring line and the trunk wiring line of the second power supply voltage wiring line, where n is a natural number equal to 2 or greater, each of the one or more adjustment circuits and the pixel circuits is disposed between the branch wiring line of the first power supply voltage wiring line and the branch wiring line of the second power supply voltage wiring line, and is connected to each of the branch wiring line of the first power supply voltage wiring line and the branch wiring line of the second power supply voltage wiring line in each of the n sets of branch wiring lines, and each of the n sets of branch wiring lines includes a portion in which the one or more adjustment circuits and the pixel circuits are alternately provided.

15. The display device according to claim 1, wherein a plurality of adjustment circuits, including the one or more adjustment circuits, is provided, and a resistance value of the adjustment element included in an adjustment circuit disposed farther from a starting point, at which the high potential side power supply and the low potential side power supply are supplied, in each of a trunk wiring line of the first power supply voltage wiring line and a trunk wiring line of the second power supply voltage wiring line, is smaller than a resistance value of the adjustment element included in another adjustment circuit disposed closer to the starting point.

16. A display device comprising:

a plurality of subpixels that includes pixel circuits including, respectively, light-emitting elements;

a display region that includes the plurality of subpixels;

a frame region that is provided outside the display region;

a first power supply voltage wiring line for supplying a high potential side power supply to the pixel circuits;

a second power supply voltage wiring line for supplying a low potential side power supply to the pixel circuits;

one or more adjustment circuits, each of which includes a switching element and an adjustment element and is connected to the first power supply voltage wiring line and the second power supply voltage wiring line; and a control circuit that controls a current value of the adjustment element based on image data, wherein a plurality of adjustment circuits, including the one or more adjustment circuits, is provided, and a width of a region, in which the plurality of adjustment circuits is formed in a direction orthogonal to a direction, in which a trunk wiring line of the first power supply voltage wiring line and a trunk wiring line of the second power supply voltage wiring line extend, increases or decreases as a distance from a starting point, at which the high potential side power supply and the low potential side power supply are supplied, increases.

17. A display device comprising:

a plurality of subpixels that includes pixel circuits including, respectively, light-emitting elements;

a display region that includes the plurality of subpixels;

a frame region that is provided outside the display region;

a first power supply voltage wiring line for supplying a high potential side power supply to the pixel circuits;

a second power supply voltage wiring line for supplying a low potential side power supply to the pixel circuits;

a plurality of adjustment circuits, each of which includes a switching element and an adjustment element and is connected to the first power supply voltage wiring line and the second power supply voltage wiring line; and a control circuit that controls a current value of the adjustment element based on image data, wherein n sets of branch wiring lines, including (i) a branch wiring line of the first power supply voltage wiring line electrically connected to a trunk wiring line of the first power supply voltage wiring line and (ii) a branch wiring line of the second power supply voltage wiring line electrically connected to a trunk wiring line of the second power supply voltage wiring line, are sequentially arranged, in a direction from a position farthest from a starting point to the starting point at which the high potential side power supply and the low potential side power supply are supplied, in each of the trunk wiring line of the first power supply voltage wiring line and the trunk wiring line of the second power supply voltage wiring line, where n is a natural number equal to 2 or greater, each of the plurality of adjustment circuits is disposed between the branch wiring line of the first power supply voltage wiring line and the branch wiring line of the second power supply voltage wiring line, and is connected to each of the branch wiring line of the first power supply voltage wiring line and the branch wiring line of the second power supply voltage wiring line in a first portion of the n sets of branch wiring lines, and each of the pixel circuits is disposed between the branch wiring line of the first power supply voltage wiring line and the branch wiring line of the second power supply voltage wiring line, and is connected to each of the branch wiring line of the first power supply voltage wiring line and the branch wiring line of the second power supply voltage wiring line in a second portion of the n sets of branch wiring lines.

18. The display device according to claim 17, wherein the first portion of the n sets of branch wiring lines to which each of the plurality of adjustment circuits is connected comprises sets of branch wiring lines from (i) a set of branch wiring lines disposed at the position farthest from the starting point to (ii) a set of branch wiring lines disposed at an intermediate position in each of the trunk wiring line of the first power supply voltage wiring line and the trunk wiring line of the second power supply voltage wiring line, or comprises another sets of branch wiring lines from (a) a set of branch wiring lines disposed at a position closest to the starting point to (b) the set of branch wiring lines disposed at the intermediate position in each of the trunk wiring line of the first power supply voltage wiring line and the trunk wiring line of the second power supply voltage wiring line.

* * * * *